(12) United States Patent
Gupta

(10) Patent No.: US 9,892,156 B2
(45) Date of Patent: *Feb. 13, 2018

(54) SYSTEM TO GENERATE RELATED SEARCH QUERIES

(71) Applicant: PayPal, Inc., San Jose, CA (US)

(72) Inventor: Raghav Gupta, Sunnyvale, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/935,807

(22) Filed: Nov. 9, 2015

(65) Prior Publication Data
US 2016/0140165 A1    May 19, 2016

Related U.S. Application Data

(63) Continuation of application No. 13/485,002, filed on May 31, 2012, now Pat. No. 9,183,309, which is a continuation of application No. 11/323,486, filed on Dec. 30, 2005, now Pat. No. 8,200,687.

(60) Provisional application No. 60/692,125, filed on Jun. 20, 2005.

(51) Int. Cl.
    *G06F 17/30* (2006.01)
(52) U.S. Cl.
    CPC .... *G06F 17/30395* (2013.01); *G06F 17/3097* (2013.01); *G06F 17/30867* (2013.01)
(58) Field of Classification Search
    CPC ................. G06F 17/30442; G06F 17/30395
    See application file for complete search history.

(56) References Cited

U.S. PATENT DOCUMENTS

| | | | |
|---|---|---|---|
| 4,996,642 | A | 2/1991 | Hey |
| 5,583,763 | A | 12/1996 | Atcheson et al. |
| 5,749,081 | A | 5/1998 | Whiteis |
| 5,790,790 | A | 8/1998 | Smith et al. |
| 5,825,881 | A | 10/1998 | Colvin, Sr. |
| 5,842,199 | A | 11/1998 | Miller et al. |
| 5,845,265 | A | 12/1998 | Woolston |
| 5,897,622 | A | 4/1999 | Blinn et al. |

(Continued)

FOREIGN PATENT DOCUMENTS

| | | |
|---|---|---|
| AU | 2010202828 B2 | 2/2012 |
| CN | 1398484 A | 2/2003 |

(Continued)

OTHER PUBLICATIONS

U.S. Appl. No. 10/689,970, filed Oct. 20, 2003, Listing Recommendation in a Network-Based Commerce System.

(Continued)

*Primary Examiner* — Mohammad S Rostami
(74) *Attorney, Agent, or Firm* — Maschoff Brennan

(57) ABSTRACT

Systems and methods described herein may operate to receive, at a search service, a first query from a user device corresponding to a current user of the search service, analyze existing search queries performed by users of the search service, and selectively provide, to the user device, a second query of the existing search queries as at least one of: a refinement of the first query based on determining that the second query includes all keywords in the first query, or an alternative to the first query based on determining that the second query lacks at least one keyword in the first query.

18 Claims, 16 Drawing Sheets

| FERRARI | ALL CATEGORIES  | SEARCH | ADVANCED SEARCH |

☐ SEARCH TITLE AND DESCRIPTION

RELATED SEARCHES : LAMBORGHINI, PORSCHE, BENTLEY, ASTON MARTIN, MASERATI

100

(56) References Cited

U.S. PATENT DOCUMENTS

| | | |
|---|---|---|
| 6,006,225 A | 12/1999 | Bowman et al. |
| 6,016,475 A | 1/2000 | Miller et al. |
| 6,047,264 A | 4/2000 | Fisher et al. |
| 6,049,777 A | 4/2000 | Sheena et al. |
| 6,052,514 A | 4/2000 | Gill et al. |
| 6,055,513 A | 4/2000 | Katz et al. |
| 6,085,176 A | 7/2000 | Woolston |
| 6,101,484 A | 8/2000 | Halbert et al. |
| 6,108,493 A | 8/2000 | Miller et al. |
| 6,119,101 A | 9/2000 | Peckover |
| 6,119,137 A | 9/2000 | Smith et al. |
| 6,169,986 B1 | 1/2001 | Bowman et al. |
| 6,178,408 B1 | 1/2001 | Copple et al. |
| 6,192,407 B1 | 2/2001 | Smith et al. |
| 6,195,657 B1 | 2/2001 | Rucker et al. |
| 6,202,051 B1 | 3/2001 | Woolston |
| 6,202,063 B1 | 3/2001 | Benedikt et al. |
| 6,243,691 B1 | 6/2001 | Fisher et al. |
| 6,266,649 B1 | 7/2001 | Linden et al. |
| 6,289,342 B1 | 9/2001 | Lawrence et al. |
| 6,308,168 B1 | 10/2001 | Dovich et al. |
| 6,313,745 B1 | 11/2001 | Suzuki |
| 6,321,221 B1 | 11/2001 | Bieganski |
| 6,334,127 B1 | 12/2001 | Bieganski et al. |
| 6,356,879 B2 | 3/2002 | Aggarwal et al. |
| 6,370,513 B1 | 4/2002 | Kolawa et al. |
| 6,405,190 B1 | 6/2002 | Conklin |
| 6,412,012 B1 | 6/2002 | Bieganski et al. |
| 6,430,558 B1 | 8/2002 | Delano |
| 6,466,918 B1 | 10/2002 | Spiegel et al. |
| 6,487,539 B1 | 11/2002 | Aggarwal et al. |
| 6,499,029 B1 | 12/2002 | Kurapati et al. |
| 6,643,640 B1 | 11/2003 | Getchius et al. |
| 6,671,681 B1 | 12/2003 | Emens et al. |
| 6,701,309 B1 * | 3/2004 | Beeferman ....... G06F 17/30646 |
| 6,704,727 B1 | 3/2004 | Kravets |
| 6,732,088 B1 | 5/2004 | Glance |
| 6,738,780 B2 | 5/2004 | Lawrence et al. |
| 6,772,150 B1 * | 8/2004 | Whitman .......... G06F 17/30448 |
| | | 707/721 |
| 6,782,370 B1 | 8/2004 | Stack |
| 6,826,559 B1 | 11/2004 | Ponte |
| 6,859,807 B1 | 2/2005 | Knight et al. |
| 6,963,850 B1 | 11/2005 | Bezos et al. |
| 7,003,511 B1 | 2/2006 | Antonov |
| 7,092,936 B1 | 8/2006 | Alonso et al. |
| 7,203,899 B2 | 4/2007 | Chi et al. |
| 7,225,182 B2 | 5/2007 | Paine et al. |
| 7,225,189 B1 | 5/2007 | Mccormack et al. |
| 7,389,294 B2 | 6/2008 | Kotas et al. |
| 7,546,286 B2 | 6/2009 | Dickinson et al. |
| 7,647,243 B2 | 1/2010 | Woolston |
| 7,769,746 B2 | 8/2010 | Lu et al. |
| 7,831,476 B2 | 11/2010 | Foster et al. |
| 8,005,744 B2 | 8/2011 | Hamor |
| 8,051,040 B2 | 11/2011 | Johnson et al. |
| 8,200,687 B2 | 6/2012 | Gupta |
| 8,219,484 B2 | 7/2012 | Hamor |
| 8,244,910 B2 | 8/2012 | Davis |
| 8,306,840 B2 | 11/2012 | Cohen et al. |
| 8,606,811 B2 | 12/2013 | Johnson |
| 8,712,868 B2 | 4/2014 | Foster et al. |
| 9,183,309 B2 | 11/2015 | Gupta |
| 2001/0021914 A1 | 9/2001 | Jacobi et al. |
| 2001/0037255 A1 | 11/2001 | Tambay et al. |
| 2002/0016786 A1 | 2/2002 | Pitkow et al. |
| 2002/0019763 A1 | 2/2002 | Linden et al. |
| 2002/0059116 A1 | 5/2002 | Bulatovic et al. |
| 2002/0065802 A1 | 5/2002 | Uchiyama |
| 2002/0082901 A1 | 6/2002 | Dunning et al. |
| 2002/0095404 A1 | 7/2002 | Davies et al. |
| 2002/0103789 A1 | 8/2002 | Turnbull et al. |
| 2002/0107853 A1 | 8/2002 | Hofmann et al. |
| 2002/0143660 A1 | 10/2002 | Himmel et al. |
| 2002/0147724 A1 | 10/2002 | Fries et al. |
| 2002/0156686 A1 | 10/2002 | Reiner et al. |
| 2002/0184116 A1 | 12/2002 | Tam et al. |
| 2002/0198882 A1 * | 12/2002 | Linden .............. G06F 17/30867 |
| 2003/0009411 A1 | 1/2003 | Ram et al. |
| 2003/0037050 A1 | 2/2003 | Monteverde |
| 2003/0050863 A1 | 3/2003 | Radwin |
| 2003/0055831 A1 | 3/2003 | Ryan et al. |
| 2003/0093331 A1 | 5/2003 | Childs et al. |
| 2003/0130994 A1 | 7/2003 | Singh et al. |
| 2003/0229537 A1 | 12/2003 | Dunning et al. |
| 2004/0034652 A1 | 2/2004 | Hofmann et al. |
| 2004/0103092 A1 | 5/2004 | Tuzhilin et al. |
| 2004/0128321 A1 | 7/2004 | Hamer |
| 2004/0153463 A1 | 8/2004 | Sasai et al. |
| 2004/0193612 A1 | 9/2004 | Chang |
| 2004/0205558 A1 | 10/2004 | Holloway et al. |
| 2004/0236736 A1 | 11/2004 | Whitman et al. |
| 2004/0260621 A1 | 12/2004 | Foster et al. |
| 2005/0076003 A1 | 4/2005 | DuBose et al. |
| 2005/0091209 A1 | 4/2005 | Frank et al. |
| 2005/0102259 A1 | 5/2005 | Kapur |
| 2005/0102282 A1 | 5/2005 | Linden |
| 2005/0125392 A1 | 6/2005 | Curtis et al. |
| 2005/0198068 A1 * | 9/2005 | Mukherjee ........ G06F 17/30864 |
| 2005/0234881 A1 | 10/2005 | Burago et al. |
| 2005/0234972 A1 | 10/2005 | Zeng et al. |
| 2005/0283488 A1 | 12/2005 | Colossi et al. |
| 2006/0026113 A1 | 2/2006 | Omoigui |
| 2006/0053096 A1 | 3/2006 | Subramanian et al. |
| 2006/0080292 A1 | 4/2006 | Alanzi |
| 2006/0080315 A1 | 4/2006 | Mitchell |
| 2006/0085391 A1 | 4/2006 | Turski et al. |
| 2006/0106769 A1 | 5/2006 | Gibbs |
| 2006/0129533 A1 | 6/2006 | Purvis |
| 2006/0161520 A1 | 7/2006 | Brewer et al. |
| 2006/0167857 A1 | 7/2006 | Kraft et al. |
| 2006/0195442 A1 | 8/2006 | Cone et al. |
| 2006/0206475 A1 | 9/2006 | Naam et al. |
| 2006/0212447 A1 | 9/2006 | Davis et al. |
| 2006/0224587 A1 | 10/2006 | Zamir et al. |
| 2006/0230005 A1 | 10/2006 | Bailey et al. |
| 2006/0230040 A1 * | 10/2006 | Curtis ................. G06F 17/3087 |
| 2006/0235843 A1 | 10/2006 | Musgrove et al. |
| 2006/0248078 A1 | 11/2006 | Gross et al. |
| 2006/0253458 A1 | 11/2006 | Dixon et al. |
| 2006/0271524 A1 | 11/2006 | Tanne et al. |
| 2006/0288000 A1 | 12/2006 | Gupta |
| 2007/0011154 A1 | 1/2007 | Musgrove et al. |
| 2007/0118802 A1 | 5/2007 | Gerace et al. |
| 2007/0192166 A1 | 8/2007 | Van Luchene |
| 2008/0033776 A1 | 2/2008 | Marchese |
| 2008/0077574 A1 | 3/2008 | Gross |
| 2008/0091463 A1 | 4/2008 | Shakamuri |
| 2008/0147661 A1 | 6/2008 | Carden |
| 2008/0189296 A1 | 8/2008 | Cloutier et al. |
| 2008/0294498 A1 | 11/2008 | Adrien et al. |
| 2008/0306938 A1 | 12/2008 | Johnson et al. |
| 2010/0250341 A1 | 9/2010 | Hauser |
| 2010/0325011 A1 | 12/2010 | Foster et al. |
| 2011/0055040 A1 | 3/2011 | Foster et al. |
| 2012/0016893 A1 | 1/2012 | Johnson et al. |
| 2012/0046998 A1 | 2/2012 | Staib et al. |
| 2012/0239679 A1 | 9/2012 | Gupta |
| 2014/0101183 A1 | 4/2014 | Johnson et al. |

FOREIGN PATENT DOCUMENTS

| | | |
|---|---|---|
| EP | 0957437 A2 | 11/1999 |
| JP | 2005032193 A | 9/1996 |
| JP | 09244945 | 9/1997 |
| JP | 11250086 A | 9/1999 |
| JP | 2002092032 | 3/2002 |
| JP | 2002123544 | 4/2002 |
| JP | 2002215659 A | 8/2002 |
| JP | 2004502213 A | 1/2004 |
| JP | 2005063277 A | 3/2005 |
| TW | I370373 B | 8/2012 |
| WO | WO-0017792 A1 | 3/2000 |
| WO | WO-0017793 A1 | 3/2000 |

(56) References Cited

FOREIGN PATENT DOCUMENTS

| WO | WO-0045319 | A1 | 8/2000 |
|----|------------|----|--------|
| WO | WO-0116848 | A2 | 3/2001 |
| WO | WO-0129726 | A2 | 4/2001 |
| WO | WO-0131537 | A2 | 5/2001 |
| WO | WO-0133401 | A2 | 5/2001 |
| WO | WO-0219203 | A2 | 3/2002 |
| WO | WO-0229695 | A1 | 4/2002 |
| WO | WO-0237926 | A2 | 5/2002 |
| WO | WO-2004114155 | A1 | 12/2004 |
| WO | WO-2007001980 | A2 | 1/2007 |
| WO | WO-2007001980 | A3 | 1/2007 |

OTHER PUBLICATIONS

U.S. Appl. No. 12/870,022, filed Aug. 27, 2010, Listing Recommendation in a Network-Based System.
U.S. Appl. No. 12/870,031, filed Aug. 27, 2010, Listing Recommendation Using Generation of a User-Specific Query in a Network-based Commerce System (as amended).
U.S. Appl. No. 11/869,290, filed Oct. 9, 2007, Electronic Publication System.
U.S. Appl. No. 14/100,821, filed Dec. 9, 2013, Electronic Publication System.
U.S. Appl. No. 11/323,486, filed Dec. 30, 2005, System to Generate Related Search Queries.
"U.S. Appl. No. 12/870,022, Notice of Non-Compliant Amendment dated May 24, 2016", 4 pgs.
"U.S. Appl. No. 14/100,821, Non Final Office Action dated Jan. 29, 2016", 15 pgs.
"U.S. Appl. No. 14/100,821, Response filed Apr. 29, 2016 to Non Final Office Action dated Jan. 29, 2016", 10 pgs.
"Australian Application Serial No. 2015204354, First Examiner Report dated Jan. 13, 2016", 3 pgs.
"Australian Application Serial No. 2015204354, Response filed May 10, 2016 to First Examiner Report dated Jan. 13, 2016", 25 pgs.
"Chinese Application Serial No. 201310053002.2, Response filed Feb. 29, 2016", with English translation of claims, 14 pgs.
"U.S. Appl. No. 10/689,970, Appeal Brief filed Jun. 28, 2007", 26 pgs.
"U.S. Appl. No. 10/689,970, Examiner's Answer dated Oct. 2, 2007", 14 pgs.
"U.S. Appl. No. 10/689,970, Final Office Action dated Jan. 25, 2007", 18 pgs.
"U.S. Appl. No. 10/689,970, Non Final Office Action dated Jun. 13, 2006", 14 pgs.
"U.S. Appl. No. 10/689,970, Notice of Allowance dated Jan. 20, 2010", 9 pgs.
"U.S. Appl. No. 10/689,970, Notice of Allowance dated Jun. 29, 2010", 6 pgs.
"U.S. Appl. No. 10/689,970, Reply Brief filed Dec. 3, 2007", 10 pgs.
"U.S. Appl. No. 10/689,970, Response filed Oct. 13, 2006 to Non Final Office Action dated Jun. 13, 2006", 11 pgs.
"U.S. Appl. No. 10/689,970, Supplemental Notice of Allowability dated Jul. 26, 2010", 6 pgs.
"U.S. Appl. No. 11/323,486, Advisory Action dated Feb. 9, 2010", 4 pgs.
"U.S. Appl. No. 11/323,486, Advisory Action dated Jul. 29, 2011", 3 pgs.
"U.S. Appl. No. 11/323,486, Appeal Brief filed Oct. 24, 2011".
"U.S. Appl. No. 11/323,486, Examiner Interview Summary dated Feb. 8, 2012", 1 pg.
"U.S. Appl. No. 11/323,486, Final Office Action dated Oct. 7, 2008", 34 pgs.
"U.S. Appl. No. 11/323,486, Final Office Action dated Nov. 17, 2009", 33 pgs.
"U.S. Appl. No. 11/323,486, Final Offiec Action dated Mar. 23, 2011", 46 pgs.
"U.S. Appl. No. 11/323,486, Non-Final Office Action dated Jan. 11, 2008", 22 pgs.
"U.S. Appl. No. 11/323,486, Non-Final Office Action dated Mar. 17, 2009", 33 pgs.
"U.S. Appl. No. 11/323,486, Non-Final Office Action dated May 3, 2010", 37 pgs.
"U.S. Appl. No. 11/323,486, Non-Final Office Action dated Oct. 1, 2010", 43 pgs.
"U.S. Appl. No. 11/323,486, Notice of Allowance dated Feb. 8, 2012", 17 pgs.
"U.S. Appl. No. 11/323,486, Notice of Allowance dated Mar. 6, 2012", 9 pgs.
"U.S. Appl. No. 11/323,486, Response filed Jan. 3, 2011 to Non Final Office Action dated Oct. 1, 2010", 14 pgs.
"U.S. Appl. No. 11/323,486, Response filed Jan. 7, 2009 to Final Office Action dated Oct. 7, 2008", 11 pgs.
"U.S. Appl. No. 11/323,486, Response filed Jan. 18, 2010 to Final Office Action dated Nov. 17, 2009", 14 pgs.
"U.S. Appl. No. 11/323,486, Response filed Feb. 15, 2012 to Notice of Allowance dated Feb. 8, 2012", 8 pgs.
"U.S. Appl. No. 11/323,486, Response filed Mar. 17, 2010 to Advisory Action dated Feb. 9, 2010", 12 pgs.
"U.S. Appl. No. 11/323,486, Response filed Jun. 11, 2008 to Non-Final Office Action dated Jan. 11, 2008", 17 pgs.
"U.S. Appl. No. 11/323,486, Response filed Jun. 23, 2011 to Final Office Action dated Mar. 23, 2011", 18 pgs.
"U.S. Appl. No. 11/323,486, Response filed Jul. 9, 2010 to Non Final Office Action dated May 3, 2010", 14 pgs.
"U.S. Appl. No. 11/323,486, Response filed Jul. 17, 2009 to Non Final Office Action dated Mar. 17, 2009", 12 pgs.
"U.S. Appl. No. 11/869,290, Final Office Action dated Jul. 8, 2010", 27 pgs.
"U.S. Appl. No. 11/869,290, Non-Final Office Action dated Dec. 24, 2009", 29 pgs.
"U.S. Appl. No. 11/869,290, Notice of Allowance dated Aug. 22, 2011", 6 pgs.
"U.S. Appl. No. 11/869,290, Response filed Apr. 26, 2010 to Non Final Office Action dated Dec. 24, 2009", 17 pgs.
"U.S. Appl. No. 11/869,290, Response filed Nov. 8, 2010 to Final Office Action dated Jul. 8, 2010", 19 pgs.
"U.S. Appl. No. 12/870,022, Advisory Action dated Jan. 19, 2012", 3 pgs.
"U.S. Appl. No. 12/870,022, Advisory Action dated Sep. 26, 2011", 3 pgs.
"U.S. Appl. No. 12/870,022, Advisory Action dated Nov. 9, 2011", 4 pgs.
"U.S. Appl. No. 12/870,022, Appeal Brief filed Jan. 10, 2012", 23 pgs.
"U.S. Appl. No. 12/870,022, Appeal Decision dated Apr. 28, 2015", 5 pgs.
"U.S. Appl. No. 12/870,022, Decision on Pre-Appeal Brief dated Nov. 14, 2011", 2 pgs.
"U.S. Appl. No. 12/870,022, Examiner's Answer to Appeal Brief dated May 29, 2012", 13 pgs.
"U.S. Appl. No. 12/870,022, Final Office Action dated Jul. 28, 2011", 15 pgs.
"U.S. Appl. No. 12/870,022, Non Final Office Action dated Mar. 17, 2011", 13 pgs.
"U.S. Appl. No. 12/870,022, Non Final Office Action dated Aug. 14, 2015", 19 pgs.
"U.S. Appl. No. 12/870,022, Pre-Appeal Brief Request filed Oct. 4, 2011", 5 pgs.
"U.S. Appl. No. 12/870,022, Reply Brief filed Jul. 30, 2012", 3 pgs.
"U.S. Appl. No. 12/870,022, Response filed Jun. 3, 2011 to Non Final Office Action dated Mar. 17, 2011", 16 pgs.
"U.S. Appl. No. 12/870,022, Response filed Sep. 13, 2011 to Final Office Action dated Jul. 28, 2011", 13 pgs.
"U.S. Appl. No. 12/870,022. Response filed Jan. 14, 2016 to Non Final Office Action dated Aug. 14, 2015", 18 pgs.
"U.S. Appl. No. 12/870,031, Final Office Action dated Apr. 25, 2013", 16 pgs.
"U.S. Appl. No. 12/870,031, Non Final Office Action dated Sep. 26, 2012", 15 pgs.

(56) References Cited

OTHER PUBLICATIONS

"U.S. Appl. No. 12/870,031, Notice of Allowance dated Dec. 6, 2013", 14 pgs.
"U.S. Appl. No. 12/870,031, Response filed Jul. 24, 2013 to Final Office Action dated Apr. 25, 2013", 15 pgs.
"U.S. Appl. No. 12/870,031, Response filed Dec. 26, 2012 to Non Final Office Action dated Sep. 26, 2012", 16 pgs.
"U.S. Appl. No. 13/247,798, Non Final Office Action dated Apr. 2, 2013", 8 pgs.
"U.S. Appl. No. 13/247,798, Notice of Allowance dated Aug. 5, 2013", 7 pgs.
"U.S. Appl. No. 13/247,798, Preliminary Amendment filed Oct. 4, 2011", 3 pgs.
"U.S. Appl. No. 13/247,798, Response filed Jul. 2, 2013 to Non Final Office Action dated Apr. 2, 2013", 10 pgs.
"U.S. Appl. No. 13/485,002, Advisory Action dated Jun. 12, 2015", 3 pgs.
"U.S. Appl. No. 13/485,002, Final Office Action dated Jan. 3, 2014", 34 pgs.
"U.S. Appl. No. 13/485,002, Final Office Action dated Jan. 16, 2015", 32 pgs.
"U.S. Appl. No. 13/485,002, Final Office Action dated Feb. 14, 2013", 32 pgs.
"U.S. Appl. No. 13/485,002, Final Office Action dated Sep. 14, 2012", 28 pgs.
"U.S. Appl. No. 13/485,002, Non Final Office Action dated May 23, 2014", 31 pgs.
"U.S. Appl. No. 13/485,002, Non Final Office Action dated Jun. 10, 2013", 31 pgs.
"U.S. Appl. No. 13/485,002, Notice of Allowance dated Jul. 6, 2015", 9 pgs.
"U.S. Appl. No. 13/485,002, Response filed Apr. 3, 2014 to Final Office Action dated Jan. 3, 2014", 11 pgs.
"U.S. Appl. No. 13/485,002, Response filed May 13, 2013 to Final Office Action dated Feb. 14, 2013", 12 pgs.
"U.S. Appl. No. 13/485,002, Response filed May 18, 2015 to Final Office Action dated Jan. 16, 2015", 14 pgs.
"U.S. Appl. No. 13/485,002, Response filed Sep. 10, 2013 to Non Final Office Action dated Jun. 10, 2013", 13 pgs.
"U.S. Appl. No. 13/485,002, Response filed Sep. 23, 2014 to Nan Final Office Action dated May 23, 2014", 12 pgs.
"U.S. Appl. No. 13/485,002, Response filed Dec. 14, 2012 to Non Final Office Action dated Sep. 14, 2012", 10 pgs.
"U.S. Appl. No. 14/100,821, Final Office Action dated Oct. 7, 2015", 17 pgs.
"U.S. Appl. No. 14/100,821, Non Final Office Action dated Feb. 25, 2015", 17 pgs.
"U.S. Appl. No. 14/100,821, Preliminary Amendment filed Mar. 3, 2014", 8 pgs.
"U.S. Appl. No. 14/100,821, Response filed Jun. 23, 2015 to Non Final Office Action dated Feb. 25, 2015", 7 pgs.
"U.S. Appl. No. 14/100,821, Response filed Dec. 11, 2015 to Final Office Action dated Oct. 7, 2015", 7 pgs.
"Australian Application No. 2006262446, Examiner Report dated Jan. 15, 2010", 2 pgs.
"Australian Application Serial No. 2013203878, Response filed Jun. 19, 2014 to Examiner's Report dated Mar. 7, 2014", 16 pgs.
"Australian Application Serial No. 2006262446, Response filed Dec. 24, 2009 to Examiner Report dated Mar. 20, 2009", 24 pgs.
"Australian Application Serial No. 2006262446, Examiner Report dated Mar. 20, 2009", 3 pgs.
"Australian Application Serial No. 2006262446, Response filed Mar. 23, 2010 to Examiner Report dated Jan. 15, 2010", 25 pgs.
"Australian Application Serial No. 2010202828, Response filed Sep. 28, 2011 to Office Action dated Apr. 20, 2011", 7 pgs.
"Australian Application Serial No. 2012200347, Examiner's Report dated Jul. 19, 2012", 3 pgs.
"Australian Application Serial No. 2012200347, First Examiner's Report dated Mar. 15, 2012", 2 pgs.
"Australian Application Serial No. 2012200347, Response filed Jan. 7, 2013 to Office Action dated Jul. 19, 2012", 2 pgs.
"Australian Application Serial No. 2012200347, Response filed May 14, 2012 to Examiner's Report dated Mar. 15, 2012", 9 pgs.
"Australian Application Serial No. 2013203878, First Examiner Report dated Mar. 7, 2014", 3 pgs.
"Australian Application Serial No. 2013203878, Notice of Final Rejection dated Jul. 4, 2014", 3 pgs.
"Australian Application Serial No. 2013203878, Response filed Mar. 3, 2015", 17 pgs.
"Australian Application Serial No. 2010202828, First Examiner Report dated Apr. 20, 2011", 1 pg.
"Chinese Application Serial No. 200680022268.9, Office Action dated Nov. 17, 2010", with English translation of claims, 7 pgs.
"Chinese Application Serial No. 200680022268.9, Notice of Decision to Grant dated Nov. 30, 2012", with English translation, 5 pgs.
"Chinese Application Serial No. 200680022268,9, Office Action dated Mar. 23, 2012", with English translation of claims, 7 pgs.
"Chinese Application Serial No. 200680022268.9, Office Action dated Jun. 26, 2009", with English translation of claims, 28 pgs.
"Chinese Application Serial No. 200680022268.9, Response filed Jun. 7, 2012", with English translation of claims, 10 pgs.
"Chinese Application Serial No. 200680022268.9, Response filed Nov. 11, 2009 to Office Action dated Jun. 26, 2009", with English translation of claims, 29 pgs.
"Chinese Application Serial No. 201310053002.2, Office Action dated Aug. 14, 2015", with English translation of claims, 16 pgs.
"Chinese Application Serial No. 200680022268.9, Response filed Feb. 9, 2011 to Non Final Office Action dated Nov. 17, 2010", with English translation of claims, 40 pgs.
"Computer Letter, Private Profiles—NexTag—of all the auction sites on the Web, here's one an economist might like", vol. 15, No. 28, [Online]. Retrieved from the Internet: <URL: http://www.nextag.com/serv/main/about/computer/letter.html>, (Aug. 23, 1999), 3 pgs.
"eBizAutos: It All About the Cars", [Online]. Retrieved from the Internet: <URL: http://www.ebizautos.com/>, (Accessed Apr. 15, 2005), 2 pgs.
"European Application Serial No. 06773535.7, Office Action dated May 13, 2011", 2 pgs.
"European Application Serial No. 06773535.7, Response filed Mar. 1, 2012 to Office Action dated May 13, 2011", 22 pgs.
"European Application Serial No. 06773535.7, Examination Notification Art. 94(3) dated Feb. 5, 2014", 3 pgs.
"European Application Serial No. 06773535.7, Extended European Search Report dated Sep. 24, 2010", 9 Pgs.
"European Application Serial No. 06773535.7, Response filed Apr. 11, 2011 to EP Search Report dated Oct. 12, 2010", 13 pgs.
"European Application Serial No. 06773535.7, Response filed Jun. 4, 2014", 17 pgs.
"European Application Serial No. 06773535.7, Summons to Attend Oral Proceedings dated Dec. 21, 2015", 5 pgs.
"European Application Serial No. 13167535.7, Extended European Search Report dated Jan. 24, 2014", 5 pgs.
"European Application Serial No. 13167535.7, Office Action dated Mar. 3, 2014", 2 pgs.
"European Application Serial No. 13167535.7, Response filed Jul. 30, 2014", 51 pgs.
"India Application Serial No. 9703/DELNP/2007, First Examination Report dated Feb. 22, 2013", 4 pgs.
"Indian Application Serial No. 9703/DELNP/2007, Response filed Sep. 3, 2013", 23 pgs.
"International Application Serial No. PCT/US03/33294, International Preliminary Report on Patentability dated Jan. 30, 2006", 4 pgs.
"International Application Serial No. PCT/US03/33294, International Search Report dated Jun. 14, 2005", 8 pgs.
"International Application Serial No. PCT/US03/33294, Written Opinion dated Sep. 28, 2005", 4 pgs.
"International Application Serial No. PCT/US2006/023807, International Preliminary Report on Patentability dated Jan. 10, 2008", 5 pgs.

(56) References Cited

OTHER PUBLICATIONS

"International Application Serial No. PCT/US2006/023807, International Search Report dated Feb. 28, 2007", 3 pgs.

"International Application Serial No. PCT/US2006/23807, Written Opinion dated Feb. 28, 2007", 3 pgs.

"Japanese Application Serial No. 2008-517212, Office Action dated Apr. 12, 2011", with English translation of claims, 6 pgs.

"Japanese Application Serial No. 2008-517212, Office Action dated Aug. 3, 2010", with English translation of claims, 12 pgs.

"Japanese Application Serial No. 2008-517212, Office Action Response filed Jun. 24, 2011", with English translation of claims, 25 pgs.

"Japanese Application Serial No. 2008-517212, Office Action Response filed Oct. 28, 2010", with English translation of claims, 23 pgs.

"Query—Definition by Dictionary.com", [Online]. Retrieved from the Internet: <http://dictionary.reference.com/browse/query>, (Accessed 2011), 3 pgs.

"Taiwan Application Serial No. 95122021, Office Action dated Jul. 12, 2011", with English translation of claims, 31 pgs.

"Taiwanese Application Serial No. 95122021, Notice of Allowance dated Jun. 12, 2012", with English translation, 3 pgs.

"Taiwanese Application Serial No. 95122021, Office Action dated Nov. 2, 2011", with English translation of claims, 31 pgs.

"Taiwanese Application Serial No. 95122021, Response filed Aug. 19, 2011 to Office Action dated Jul. 12, 2011", with English translation of claims, 40 pgs.

"Taiwanese Application Serial No. 95122021, Response filed Dec. 29, 2011", with English translation of claims, 28 pgs.

"WebSphere Commerce Professional Edition", [Online], Retrieved from the Internet: <URL: http://www-306.ibm.com/software/genservers/commerce/wcpe/>, (Accessed Apr. 21, 2005), 4 pgs.

Andale Gallery, "Prominently Featured on Your Listings", Copyright © 2001 Andale, Inc., [Online]. Retrieved from the Internet: <URL: http://www.andale.com/corp/tour/gal_tour4.html> Accessed on Web—Apr. 15, 2005, (Accessed Apr. 15, 2005), 1 pg.

Ardissono, Liliana, et al., "Tailoring the Interaction With Users in Electronic Shops", Proceedings of the Seventh International Conference on User Modeling, Banff, Canada, (1999), 35-44.

Balabanovic, Marko, "An Adaptive Web Page Recommendation Service", Stanford University Digital Libraries Project Working Paper, Proceedings of the First International Conference on Autonomous Agents, (1999), 378-385.

Breese, John S, et al., "Empirical Analysis of Predictive Algorithms for Collaborative Filtering", Technical Report MSR-TR-98-12—Microsoft Research, (May 1998—Revised Oct. 1998), 1-21.

Burke, Robin, "The Wasabi Personal Shopper: a case-based recommender system", Proceedings of the Sixteenth National Conference on Artificial Intelligence and the Eleventh Innovative Applications of Artificial Intelligence Conference Innovative Applications of Artificial Intelligence, (1999), 844-849.

Changchien, S, "Mining association rules procedure to support online recommendation by customers and product fragmentation", Expert Systems with Application, 20(4), (May 2001), 325-335.

Cheung, N., "Buy this! [e-commerce recommendation software]", Information Age, (Feb. 2001), 33-4.

Cheung, W., "Mining customer preference ratings for product recommendation using the support vector machine and the latent class model", Proceedings of the 2nd International Conference on Data Mining Methods and Databases for Engineering, Finance and Other Fields, Cambridge, UK, (Jul. 2000), 601-10.

Chien, Yi-Ying, "A personalized Internet shopping agent", Proceedings of the International Conference on Parallel and Distributed Processing Techniques and Applications. PDPTA'2000, pt. 4, (2000), 1849-55.

Chun, In-Gook, et al., "The implementation of knowledge-based recommender system for electronic commerce using Java expert system library", International Symposium on Industrial Electronics, 2001. Proceedings, ISIE 2001, vol. 3, (Jun. 12-16, 2001), 1766-1770.

Claypool, Mark, et al., "Inferring User Interest (Aug. 2001)", Computer Science Technical Report Series, (Aug. 31, 2001), 1-17.

Cotlier, Moira, "The Electronic Catalog: Upselling Online Can Raise Top Line", Catalog Age, 18(7), (Jun. 1, 2001), 93.

Demiriz, Ayhan, "Enhancing Product Recommender Systems on Sparse Binary Data", E-Buisiness Department, Verizon, Inc., (2002), 1-17.

Greco, Carl, "What you should know before joining an Internet Mall", Direct Marketing, 61(10), (Feb. 1999), 42-3.

Harvey, L, ""On Birthdays" mortgages, ice cream sundaes, and term life. How personalization and cross selling tools provide cross-selling in the enterprise", E-business Strategies & Solutions, (Jul. 1999), 31-5.

Hirooka, Yasuo, et al., "Extending Content-Based Recommendation by Order-Matching and Cross-Matching Methods", Lecture Notes in Computer Science; vol. 1875, Proceedings of the First International Conference on Electronic Commerce and Web Technologies, (2000), 177-190.

Hong, Se June, et al,, "A New Approach for Item Choice Recommendations", Proceedings of the Third International Conference on Data Warehousing and Knowledge Discovery, (2001), 131-140.

Iacobucci, Dawn, "Recommendation Agents on the Internet", Journal of Interactive Marketing, 14(3), (2000), 2-11.

Kanemoto, H, "Web Customer Action Analysis System", Matsushita Technical Journal, 48(1), (Feb. 2002), 26-29.

Karypis, George, "Evaluation of Item-Based Top-N Recommendation Algorithms", Technical Report #00-046, http://www-users.cs.umn.edu/~karypis/publications/Papers/PDF/itemrs.pdf, (2000), 1-13.

Kitts, Brendan, et al., "Cross-sell: A Fast Promotion-Tunable Customer-item Recommendation Method Based on Conditionally Independent Probabilities", Proceedings of the sixth ACM SIGKDD international conference on Knowledge discovery and data mining, Boston, MA USA, (Aug. 2000), 437-446.

Kohrs, Arnd, et al., "Using category-based collaborative filtering in the Active WebMuseum", 2000 IEEE International Conference on Multimedia and Expo, 2000, ICME 2000, vol. 1, (Jul. 30-Aug. 2, 2000), 351-354.

Kumar, Ravi, "Recommendation Systems: A Probabilistic Analysis", Journal of Computer and System Sciences, 63(1), (Aug. 2001), 42-61.

Kwak, Mary, "Web Sites Learn to Make Smarter Suggestions", MIT Sloan Management Review, 42(4), (Summer 2001), 17.

Kwak, Mira, "Collaborative filtering with automatic rating for recommendation", IEEE International Symposium on Industrial Electronics, 2001. Proceedings, ISIE 2001, vol. 1, (Jun. 12-16, 2001), 625-628.

Kyeonah, Yu, "Improving the performance of collaborative recommendation by using multilevel similarity computation", Artificial Intelligence and Soft Computing : Proceedings of the IASTED International Conference,, (Jul. 24-26, 2000), 241-5.

Lee, Wee Sun, "Collaborative Learning for Recommender Systems", Proceedings of the Eighteenth International Conference on Machine Learning, (2001), 314-321.

Lin, Weiyang, et al., "Efficient Adaptive-Support Association Rule Mining for Recommender Systems", Data Mining and Knowledge Discovery, 6(1), (2001), 83-105.

Linden, G, et al., "Amazon.com recommendations item- to- item collaborative filtering", IEEE Internet Computing vol. 7, No. 1, DOI : 10.1109/MIC 2003; XP011095524, (Jan. 1, 2003), 76-80.

Linden, G., et al., "Amazon.com recommendations: item-to-item collaborative filtering", IEEE Internet Computing, 7(1), (Jan.-Feb. 2003), 76-80.

Loney, Fred N, "Faceted Preference Matching in Recommender Systems", Proceedings of the Second International Conference on Electronic Commerce and Web Technologies, (2001), 295-304.

Maes, Pattie, et al., "Agents that Buy and Sell", Communications of the ACM 42(3), (Mar. 1999), 81-91.

McAllister, Neil, "Getting Personal", New Architect, (Nov. 2001), 1-8.

Ohkubo, M., et al., "Extracting Information Demand by Analyzing a WWW Search Log", Transactions of Information Processing Society of Japan, 39(7), (Jul. 15, 1998), 2250-2258.

(56) References Cited

OTHER PUBLICATIONS

Pedersen, P., "Behavioral Effects of Using Software Agents for Product and Merchant Brokering: An Experimental Study of Consumer Decision-Making", International Journal of Electronic Commerce, 5(1), (Fall 2000), 125-141.

Pennock, David M, et al., "Social Choice Theory and Recommender Systems: Analysis of the Axiomatic Foundations of Collaborative Filtering", Proceedings of the Seventeenth National Conference on Artificial Intelligence and Twelfth Conference on Innovative Applications of Artificial Intelligence, (2000), 729-734.

Ramakrishnan, N, et al., "Privacy risks in recommender systems", IEEE Internet Computing, 5(6), (Nov.-Dec. 2001), 54-63.

Roe, Andy, "Amazon Adds Seller Services", [Online]. Retrieved from the Internet: <URL: http://web.archive.org/web/20000816024400/http://www.auctionwatch.com/awdaily/dailynews/august99/3-081899.html>, (Aug. 18, 1999), 2 pgs.

Sarwar, B., et al., "Analysis of recommendation algorithms for e-commerce", Proceedings of the 2nd ACM conference on EC, (2000), 158-167.

Schafer, J, et al., "E-commerce recommendation applications", Data Mining and Knowledge Discovery, 5(1-2), (2001), 115-153.

Schafer, J., et al., "E-Commerce Recommendation Applications", GroupLens Research Project, Dept. of Computer Science & Engineering, University of Minnesota, Minneapolis, (2001), 1-24.

Schafer, J. Ben, et al. "Recommender Systems in E-Commerce", Department of Science and Engineering—University of Michigan, (2001), 1-9.

Schien, Andrew I, et al., "Methods and Metrics for Cold-Start Recommendations", Proceedings of the 25th Annual International ACM SIGIR Conference on Research and Development in Information Retrieval (SIGIR 2002), (2002), 1-9.

Schubert, Petra, "Virtual Communities of Transaction:The Role of Personalization in Electronic Commerce", Electronic Markets Journal, 10(1), (2000), 1-13.

Seitz, Juergen, et al., "Impacts of Software Agents in E-Commerce Systems on Customer?s Loyalty and on Behavior of Potential Customers", Chapter 13 from Strategies for eCommerce Success: by Bijan FazIollahi, IRM Press, (2000), 9 pgs.

Towle, Brendon, et al., "Knowledge Based Recommender Systems Using Explicit User Models", Knowledge Based Electronic Markets, (2000), 74-77.

Tran, T., "Hybrid Recommender Systems for Electronic Commerce", Proceedings of the Seventeenth National Conference on Artificial Intelligence (AAAI-00) Workshop on Knowledge-Based Electronic Markets, (2000), 78-84.

Wilder, C, et al., "E-Commerce Emerges", Information Week, No. 584, (Jun. 17, 1996), 14-15.

\* cited by examiner

| FERRARI | ALL CATEGORIES ▽ | SEARCH | ADVANCED SEARCH

☐ SEARCH TITLE AND DESCRIPTION

RELATED SEARCHES : LAMBORGHINI, PORSCHE, BENTLEY, ASTON MARTIN, MASERATI

```
RELATED SEARCHES
TOP 9 RELATED SEARCHES FOR EBAY
SEARCH REFINEMENTS:
 • EBAY MOTORS        • EBAY AUCTION       • MY EBAY
 • EBAY.COM           • EBAY EDUCATION     • EBAY UNIVERSITY
 • BOOKS ON EBAY      • EBAY STORES        • SELLING ON EBAY
```

```
RELATED SEARCHES
TOP 15 RELATED SEARCHES FOR EBAY
SEARCH REFINEMENTS:
 • EBAY MOTORS        • EBAY AUCTION       • MY EBAY
 • EBAY.COM           • EBAY EDUCATION     • EBAY UNIVERSITY
 • BOOKS ON EBAY      • EBAY STORES        • SELLING ON EBAY

SEARCH ALTERNATIVES:
 • HALF.COM           • PAYPAL             • PAYPAL CREDIT CARD
 • RENT.COM           • CRAIG'S LIST       • AUCTION NEWS
```

```
RELATED SEARCHES
SEARCH REFINEMENTS:
 • ROLEX SUBMARINER   • ROLEX EXPLORER     • ROLEX BAND
 • ROLEX WATCH        • MENS ROLEX         • LADIES ROLEX
 • ROLEX DAYTONA      • ROLEX OYSTER       • ROLEX DATEJUST
```

RELATED SEARCHES

SEARCH REFINEMENTS:
- ROLEX SUBMARINER
- ROLEX DATEJUST
- ROLEX OYSTER
- ROLEX WATCH
- ROLEX EXPLORER
- ROLEX IMMITATION WATCHES
- ROLEX DAYTONA
- MENS ROLEX
- ROLEX BAND

SEARCH ALTERNATIVES:
- OMEGA
- MOVADO
- DESIGNER WATCHES
- TAG HEUER DESIGNER WATCHES
- TIFFANY
- LADIES JEWELERY WATCHES
- CARTIER
- CLASSIC WATCHES
- MENS WATCHES

*My eBay*

HOME | PAY | REGISTER | SERVICES | SITE MAP  
BUY | SELL | MY EBAY | COMMUNITY | HELP

START NEW SEARCH | SEARCH  
ADVANCED SEARCH

HOME > MY EBAY > ALL BUYING > FAVORITE MERCHANDISE

POWERED BY IBM

FREE $25 GIFT CERTIFICATE UPON FIRST CARD USE

MY EBAY VIEWS

MY SUMMARY

HELLO, SKITTERBALL (56 ★) ME

PERSONALIZED PICKS ARE UPDATED BASED ON ITEMS YOU BROWSE FOR OR BUY

ALL BUYING
- WATCHING(14)
- BIDDING(1)
- WON(1)
- DIDN'T WIN

PERSONALIZED PICKS

RECOMMENDATIONS BASED ON YOUR LAST SEARCH

YOUR LAST SEARCH WAS HARRY POTTER (IN COLLECTIBLES...> MAGIC)

SEARCH REFINEMENTS:

ALL SELLING
- SCHEDULED
- SELLING
- SOLD
- UNSOLD

HARRY POTTER POSTERS        HARRY POTTER POSTERS         HARRY POTTER WITCH HAT
HARRY POTTER BROOM          HARRY POTTER FIGURINES       HARRY POTTER CHESS
HARRY POTTER WAND           HARRY POTTER T-SHIRT         HARRY POTTER SCARF

SEARCH ALTERNATIVES:

MY MESSAGES (1)^NEW

WIZARDS WAND                HOGWARTS PATCHES             SLYTHERIN TIE
HOGWARTS UNIFORM            GRYFFINDOR PATCH

ALL FAVORITES
- SEARCHES
- SELLERS

BACK TO TOP

SYSTEM TO GENERATE RELATED SEARCH QUERIES

CROSS-REFERENCE TO RELATED APPLICATIONS

This application is a continuation of U.S. application Ser. No. 13/485,002, filed on May 31, 2012, which is a continuation of U.S. application Ser. No. 11/323,486, filed on Dec. 30, 2005, now issued as U.S. Pat. No. 8,200,687, which claims the priority benefits of U.S. Provisional Application No. 60/692,125, filed on Jun. 20, 2005, both of which are incorporated herein by reference in their entirety.

BACKGROUND

Networked commerce systems, such as Internet-based auction systems, depend upon user specified searches to locate items of commerce. While some users are highly skilled at locating desired items, a large segment of users lack knowledge helpful in navigating such systems. As a result, inefficient use of the system and a lack of user traffic to some commerce items can be experienced.

To increase sales, some commerce systems have provided recommendations to users based upon purchasing performance of prior users. For example, when viewing a product the system may indicate that users who purchased the product also purchased a second identified product. This system does not assist the user in navigating but merely provides suggestions to increase sales. What is needed is a system to assist users in navigating a network based commerce system.

BRIEF DESCRIPTION OF THE DRAWINGS

Figure 4:
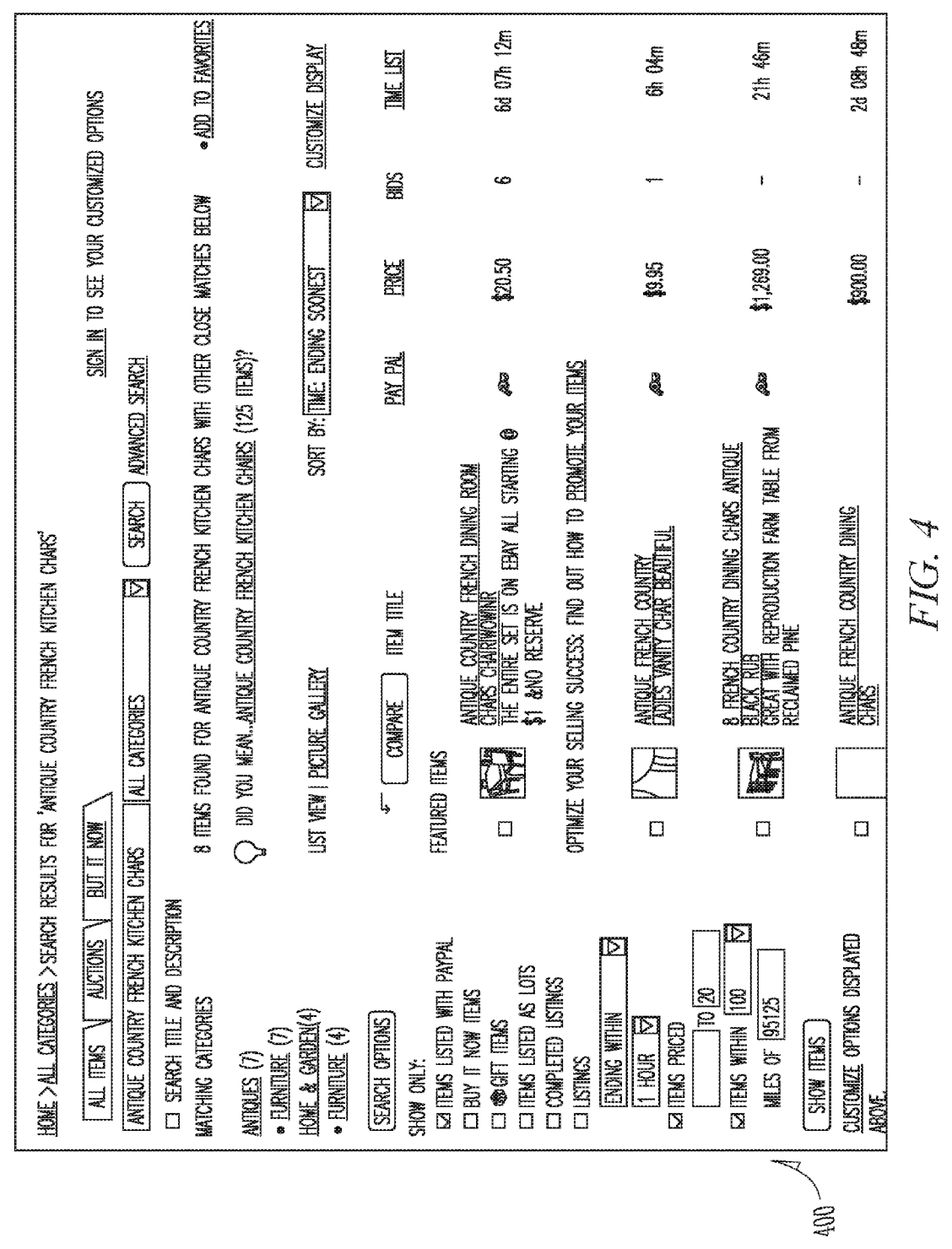

FIGS. 3-5 are additional page views of user interfaces:

FIGS. 7, 8A, 8B, 9A, 9B, and 10-13 are additional page views of user interfaces;

DETAILED DESCRIPTION

Figure 1:
FIG. 1 is a page view of a user interface.

Methods and systems to search or access a data source are described. In the following description, for purposes of explanation, numerous specific details are set forth in order to provide a thorough understanding of the invention. It will be evident, however, to one skilled in the art that the invention may be practiced without these specific details.

In various embodiments, a first query may be received, at a search service, from a user device corresponding to a current user of the search service. Existing search queries performed by users of the search query may be analyzed. As a result of the analyzing, a second query of the existing search queries may be selectively provided, to the user device, as at least one of: a refinement of the first query based on determining that the second query includes all keywords in the first query, or an alternative to the first query based on determining that the second query lacks at least one keyword in the first query. Other embodiments are possible. More detailed explanations of various embodiments are provided below with respect to FIGS. 1-17.

In various embodiments, new recommendations are provided to a search interface to assist users in navigating toward new searches that are likely to generate results aligned with the user's searching intentions. In one embodiment, an algorithm analyzes previous search sessions to determine a "next best place" for the user to go. In an example of a commerce system, new information placement may be added to the top of search and listings pages to show links to new searches that can be run by the user. On a periodic basis, the search recommendations may be updated, for example based on the most current changes in user behavior. For example see the page view 100 of FIG. 1. Where a search term "Ferrari" in "all categories" provides related search suggestions of "Lamborghini", "Porche", "Bentley", "Aston Martin" and "Maserati."

An embodiment seeks to improve the searching experience by directing users to searches that have proven successful in the past. Users who execute one of the search recommendations may be more successful searching for, and locating, data items of interest. The recommended additional search options may prove useful to non-expert users of a data resource, specifically those users who need more guidance on which search terms they should use to successfully find data items on a data resource.

User provided searches that are determined to be of poor quality can include offensive terms, terms that are not relevant, and terms that drive the user more in a particular direction than another (e.g., toward a particular type of brand instead of a competing brand, in a commerce environment). As such, recommended alternate searches can be provided.

In various embodiments, a search and recommendation engine seeks to provide recommendations for a further search (e.g., query terms) based on the observed (or recorded) behavior of users of the search and recommendation engine with respect to an information resource. For example, the search and recommendation engine, after having received a first search query including the term "Toyota", may recommend a further search query including the term "Honda". The recommendation of the further search query is based upon, in one embodiment, having observed (or recorded) that a certain threshold number of users provided search queries including the term "Honda", subsequent to providing a search query including the term "Toyota".

Further, in various embodiments, whether or not the search and recommendation engine recommends the further search query (and also how the search engine ranks the further search query) may be based on post-search user or system behavior (or activities) with respect to the information resource. For example, where the search engine recorded that the further search query (e.g., including the term "Honda") previously delivered less than a predetermined number of search results, a recommendation ranking with respect to the further search query (relative to other candidate search queries) may be reduced.

Where the search and recommendation engine recorded the presence (or absence) of certain post-search user behavior, this information may be utilized to rank the further search query and/or utilized to determine whether to provide the further search query as a recommended search query. For example, in the context of a commerce system, where the recorded past user behavior indicated that, subsequent to a particular candidate search recommendation, a threshold number of users purchased (or entered into bidding or some other transaction activity) with respect to one or more products/services identified by the particular candidate search recommendation, such a particular candidate search recommendation may receive a higher recommendation ranking than a further candidate search recommendation that did not result in transaction activity. In one example, the search and recommendation engine may track the number of users that performed search A, then performed search B. and then performed certain post-search activity with respect to a result set returned by search B. Accordingly, it will be the appreciated that a recommended search query (e.g., search B) may or may not include terminology that is common with a preceding, base search query (e.g., search A) that is utilized to generate (or identify) the recommended search query.

In various embodiments, an algorithm implemented by the search and recommendation engine analyzes tracked (or logged) session data to determine other searches that are later in the path of page views for users who ran the same (or a similar) query as is currently being run, and who were eventually successful in a specified or predetermined activity (e.g., in placing a bid, in a network-based auction system).

Figure 2:
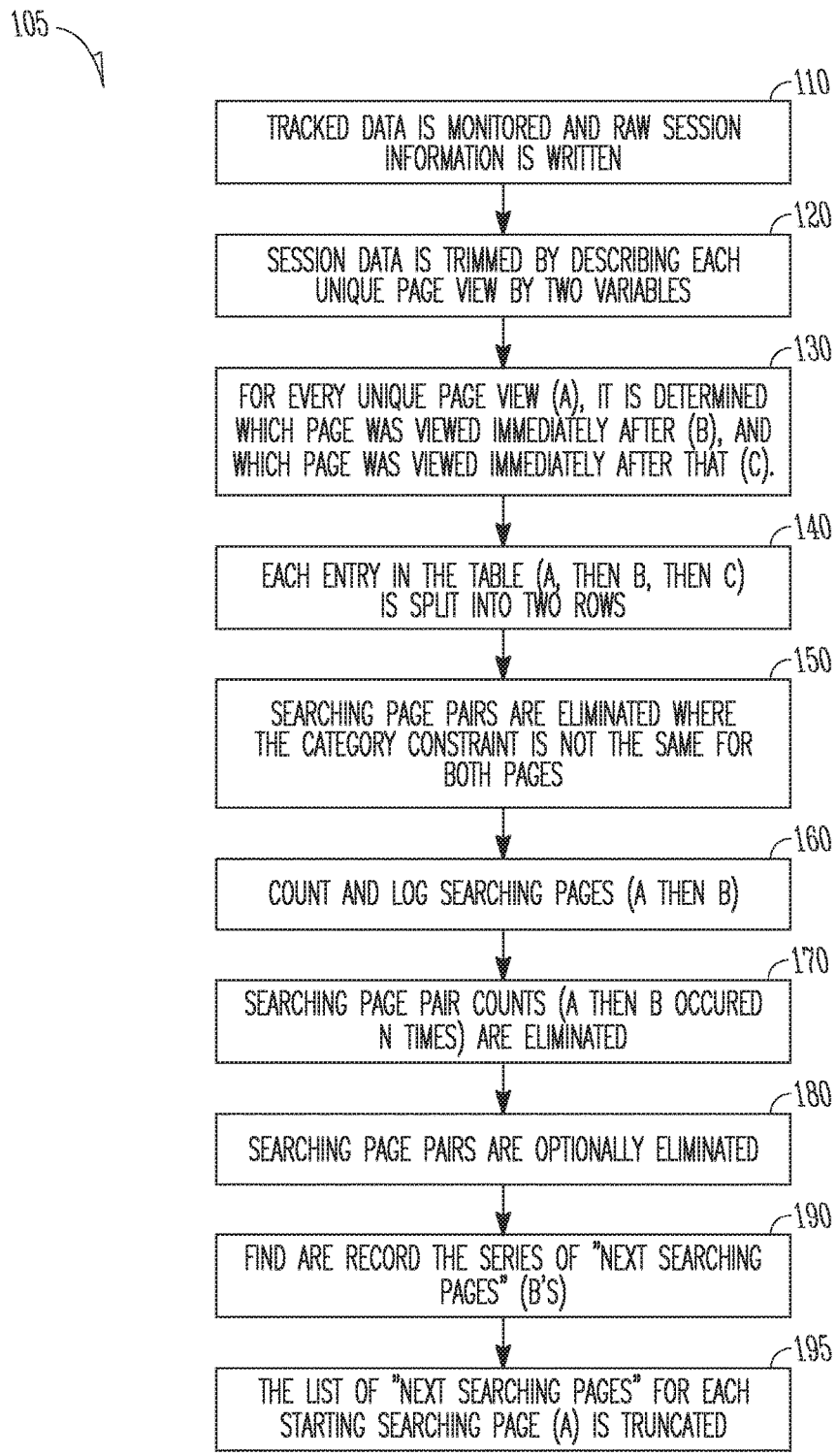
FIG. 2 is a flow chart illustrating a method of one embodiment.

Referring to both FIG. 2 and Table 1 a method is described for an algorithm 105 to generate search recommendations that can be offered to a user. At operation 110, Tracked data is monitored and raw session information is written based on LOOKBACK_PERIOD and SAMPLING_RATE configurations. At operation 120, the session data is trimmed by describing each unique page view by two variables only: the search phrase and the category constraint. The search term and category constraint are an input variable that refers to a combination of a keyword (or other search phrase or input) and a category constraint. The keyword can be null if there is a category constraint and the category constraint can be the root category if there is a keyword applied. For each Searching page (A), the search phrase (A1) and the category constraint (A2) are logged.

At operation 130, for every unique page view (A), it is determined which page was viewed immediately after (B), and which page was viewed immediately after that (C). At 140, each entry in the table (A, then B, then C) is split into two rows, where the first row is the unique page view in question followed by the next page view (A then B) and the second row is the page view in question followed by the page view after that (A then C). Now, each unique page view should have two rows in this table, unless the page view was the last or second to last in the user's session.

At operation 150, all Search page pairs are eliminated where the category constraint is not the same for both pages, or the search phrase is the same for both pages. This may leave a list of Searching page pairs where the category constraint has not changed but the search phrase has. In another embodiment, the search pairs are not eliminated where the category constraint is not the same, but the search phrase is the same. In this embodiment, the system generates recommendations to the user to perform the same search phrase in a different category. Further, where both the category constraint and search phrase change the system can provide a recommendation of expected success based upon prior user performances.

The number of times that each pair of Searching pages (A then B) appears in the exact same order is counted at operation 160 and that number is logged for each Searching page pair (A then B occurred N times). At operation 170, all Searching page pair counts (A then B occurred N times) are eliminated where the number of times that sequence was run (N) was less than the MIN_TRAFFIC_COUNT parameter.

All Searching page pairs are optionally eliminated at operation 180 where the category constraint is in the Mature Audiences category, any word in either of the two search phrases is on a blacklist for that site, or the search phrase contained complex search operators (such as minus, parentheses, etc.) For each starting Searching page (A), at operation 190 the method finds and records the series of "next Searching pages" (B's) in descending order of how many times the Searching page pair was counted (For A: B occurred 12 times, C occurred 9 times. D occurred 6 times. E occurred 4 times). Finally, at operation 195, the list of "next Searching pages" for each starting Searching page (A) is truncated so that it does not exceed the MAX_REL_SEARCHES parameter.

TABLE 1

| Configuration | Description | Configurable By |
| --- | --- | --- |
| SAMPLING_RATE | This is the percentage of sessions that are fed into the Related Searches raw data in step 1 (below). | Site |
| LOOKBACK_PERIOD | This is the amount of time the Related Searches algorithm may look back to consider which searches are related to which Searching pages. Data older than this period may be ignored. | Site |
| UPDATE_PERIODICITY | This is the length of time that should go by between updates to the Related Searches output. It establishes a frequency for updating the recommendations and feeding those updates into Production. | Global |
| MIN_TRAFFIC_COUNT | This is the minimum number of users who may have independently run the same sequence of searches for a Related Search recommendation to be considered good enough to be counted. | Site |
| MAX_REL_SEARCHES | This is the maximum number of Related Searches that should be stored for a given search phrase-category pair. | Global |

Displaying Related Searches on Search, Listings, and Cross-Stores Search

Figure 3:
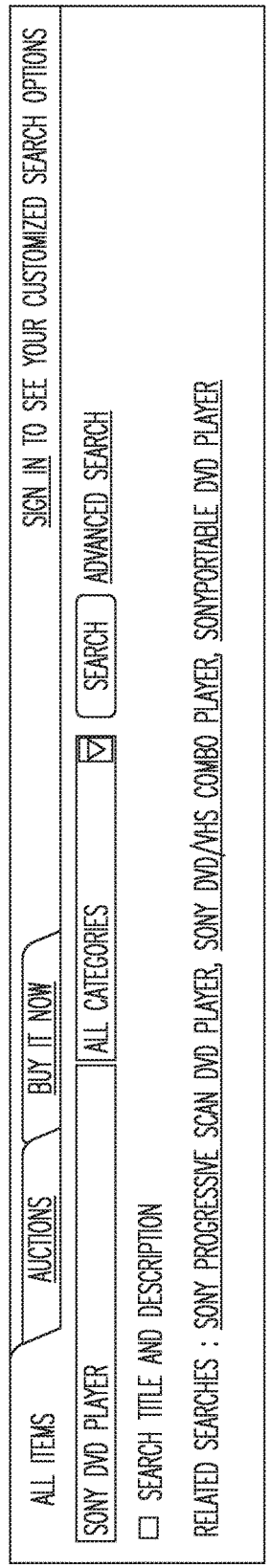

The Related Searches module may appear on Searching pages as an additional line of links below the search box, as shown in the page view 300 of FIG. 3. The Related Searches placement is based on a current query that the user is running. To determine which related searches to display, the system may analyze the search phrase and the category constraint, ignoring everything else, except attributes.

Related Searches may not appear if certain predetermined conditions are present, for example the current query contains an attribute constraint, or the current query is a title and description search. Whether the Related Searches placement appears, in various embodiments, depends on whether there are recommendations available given the current search phrase and category constraint. Whether the Related Searches function is invoked also depend on whether other types of recommendations that also appear on the Searching page, in various embodiments.

Resolving Recommendation Conflicts

In one embodiment, there are multiple types of search modification (or enhancement) recommendations that can appear on Searching pages. For example, Related Searches, Spell Check. RIS (Recommendation in Search) and PTS (Product Titles in Search) search modification recommendations. Recommendations developed by the Relates Searches algorithm could conflict/overlap with some of the recommendations from the other systems. To avoid redundancy, conflict solution logic may determine how the recommendations co-exist, as explained below.

Resolving Conflicts with Spell Check

If a Spell Check recommendation surfaces (based on the existing surfacing rules), then the Related Searches module may not appear, in various embodiments. See FIG. 4 for a page view 400 of an example spell check recommendation correcting the term "chars" with "chairs".

Resolving Conflicts with PTS

If one or more PTS (Product Titles in Search) recommendations surfaces (based on existing surfacing rules), then the Related Searches module may appear, but the list of recommendations appearing may be filtered to avoid displaying recommendations that overlap too closely with PTS.

In various embodiments, the only recommendations that may be allowed in the Related Searches module while PTS recommendations appear are ones where the search terms in the recommendation are not a superset of the search terms in the current query. Related Searches recommendations where additional keywords are added to the query but no keywords are changed may not be acceptable when PTS appears.

Figure 5:

For example, if the user was searching on "Top Gun" in the DVDs category PTS recommendations appear; in this case a Related Searches recommendation for "Mission Impossible" is allowed, but a recommendation for "Top Gun DVD New" is not allowed. Referring to FIG. 5, a page view 500 example is illustrated wherein a search for "Deception Point" provides related searches for "Angels and Demons" and "Digital Fortress".

Resolving Conflicts with RIS

The potential conflict between Related Searches and RIS (Recommendation in Search) can be handled by a new configuration (RIS_CONFLICT). There may be three possible values for RIS_CONFLICT, and the setting may determine exactly how Related Searches and RIS interact, see Table 2. As known to those in the art, a 'widget' is typically a rectangular section (like a module) on a web page used to demarcate different logical pieces of information on a web page. Most web pages are composed of various widgets showing different types of information. Sometimes users are given the choice to customize what widgets they want to see and which widgets they don't want to see.

TABLE 2

| RIS_CONFLICT Setting | Required Interaction |
| --- | --- |
| RIS Wins | If a RIS recommendation surfaces (based on the existing surfacing rules), then a Related Searches widget may not be shown |
| Related Searches Wins | If based on the rules described above, a. Related Searches widget would appear, than no RIS recommendations may be shown |
| RIS and Related Searches Coexist | Related Searches and MS recommendations can appear independent of each other; however, in the event that the Related Searches widget does appear, the maximum number of RIS recommendations that could otherwise be shown (currently set to 3) would be reduced by 1 (down to 2) |

Figures 7, 8A:
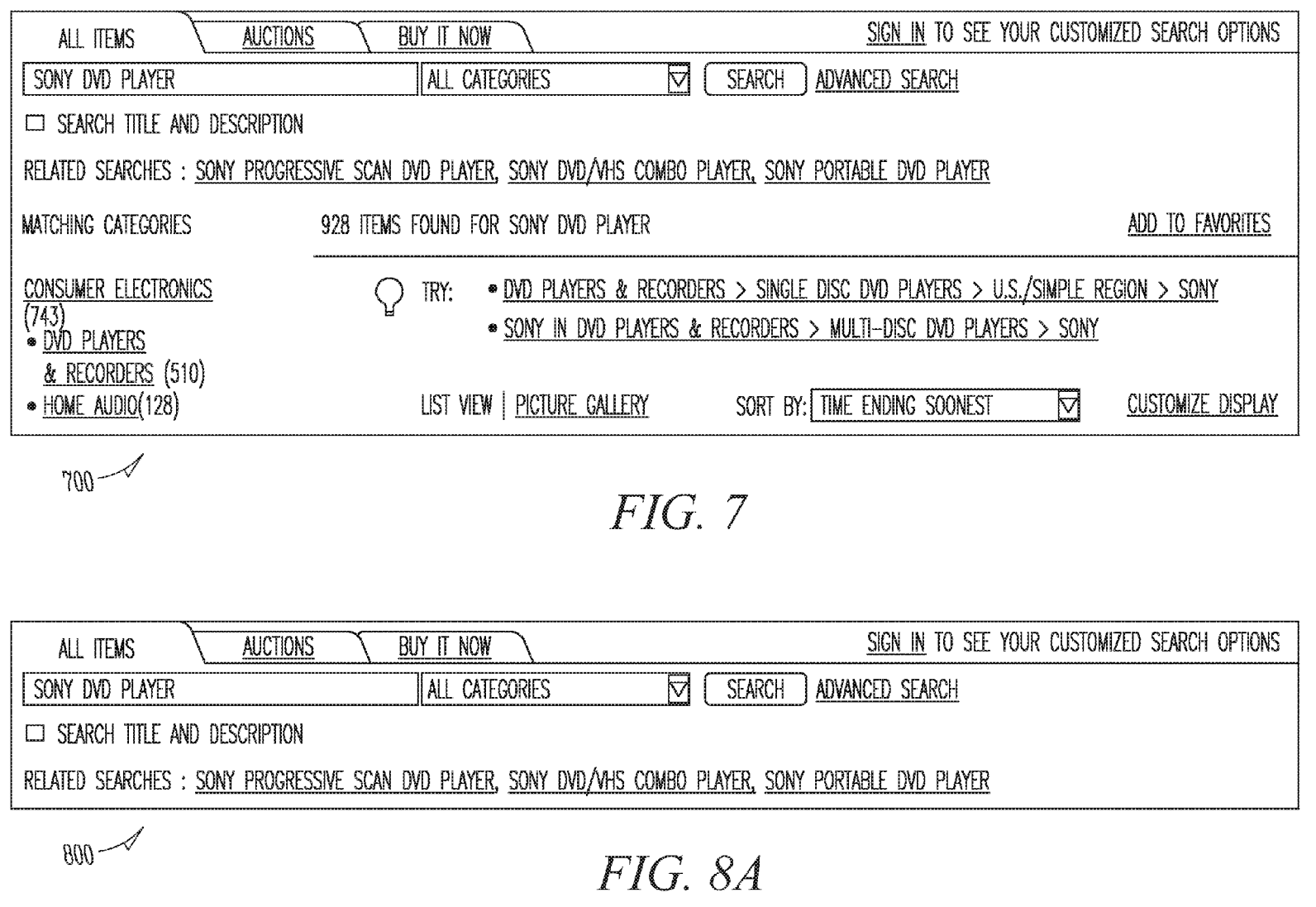

The default setting for RIS_CONFLICT for all sites may be "RIS and Related Searches Coexist". The example page view 700 of FIG. 7 shows how Related Searches and RIS recommendations may appear together based on this setting.

Determining the Recommendations to Display

When displayed subject to the conflict resolution rules above, the Related Searches widget may appear immediately below the search box. Recommendations may always appear as individual links oriented horizontally in a single row. Five site-specific configurations may govern the display properties of the Related Searches widget, as shown in Table 3.

TABLE 3

| Configuration | Description | Default Values |
| --- | --- | --- |
| MIN_ATTEMPTED_SA_RECOS | This is the minimum number of search alternative-type recommendations that may be displayed before refined search-type recommendations are displayed | All sites: 0 |
| MIN_ATTEMPTED_RS_RECOS | This is the minimum number of refined search-type recommendations that may be displayed before search alternative-type recommendations are displayed | All sites: 0 |
| MAX_REL_SEARCHES | This represents the absolute maximum number of Related Searches recommendations allowed to appear in the Related Searches widget, regardless of space constraints. | All sites: 5 |
| TOTAL_CHAR_LIMIT | This represents the maximum number of characters allowed for the sum of all the Related Searches recommendations displayed in the widget (including comma separators and spaces), ensuring the recommendations do not take up more than one line in the HTML. | All other sites: 100 |
| RECO_TYPE_ORDER | This is the order in which search alternatives and search refinements relative to each other. | All sites: search alternatives appear before search refinements |

Turning off Related Searches with MAX_REL_SEARCHES can be performed as follows. If MAX_REL_SEARCHES is set to 0, then Related Searches may not appear on any page (e.g., search, listings, cross-stores search, dynamic landing page (DLP), Personalized web page). Otherwise, MAX_REL_SEARCHES only has impact on the Searching pages (e.g., search, listings, cross-stores search). In other words, MAX_REL_SEARCHES influences search, listings, and cross-stores search only, but works as a universal feature shut-off switch when set to 0.

Given that MAX_REL_SEARCHES is not set to zero, recommendations may be selected to appear on search, listings, and cross-stores searches as follows. If the sum of MIN_ATIEMPTED_RS_RECOS and MIN_ATTEMPTED_SA_RECOS is greater than MAX_REL_SEARCHES, then both MIN_ATTEMPTEDRS_RECOS and MIN_ATTEMPTED_SA_RECOS may be ignored. (This situation makes no sense, and is an indication that the parameters have been incorrectly set.)

Figure 6:
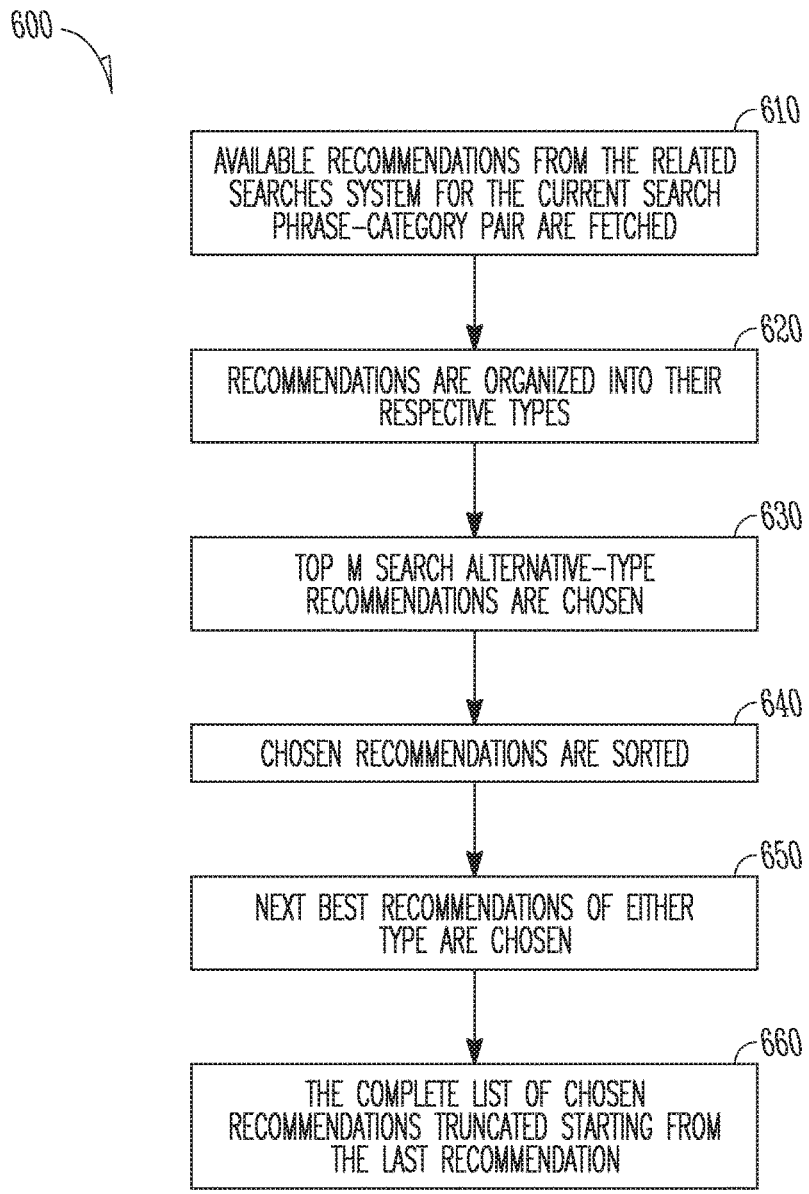
FIG. 6 is a flow chart illustrating a method of one embodiment.

Referring to FIG. 6 a flow chart 600 is described for managing the recommendations to display. At operation 610 all the available recommendations coming from the Related Searches system for the current search phrase-category pair are fetched. At operation 620 the recommendations are organized into their respective types. If all of the keywords of the current search phrase can be found in the search phrase of the recommendation, then the recommendation type is refined search, else, the recommendation type is search alternative.

At operation 630 the top M search alternative-type recommendations are chosen (based on frequency count, as described in the Related Searches algorithm section), where M is the setting for MIN_ATTEMPTED_SA_RECOS. Also choose the top N refined search-type recommendations (based on frequency count, as described in the Related Searches algorithm section), where N is the setting for MIN_ATTEMPTED_RS_RECOS. The chosen recommendations are sorted at operation 640 by type, then by frequency count highest to lowest, where the preferred type is determined by the setting of RECO_TYPE_ORDER.

At operation 650, the next best recommendations of either type are chose until the total number of recommendations chosen is equal to MAX_REL_SEARCHES. These recommendations may be ordered after the recommendations already selected. The sort order within this set may be based on frequency count only. Finally, at operation 660 the complete list of chosen recommendations truncated starting from the last recommendation, until the total number of characters of the recommendations (taking into consideration the four characters that may separate each recommendation) is not greater than the MAX_CHAR parameter.

If, after executing these rules, there are no Related Searches recommendations to display, then the Related Searches widget may not appear at all, and the space it otherwise would have taken up would collapse. When presented, the recommendations in the Related Searches widget may always be sorted by highest-relevance first.

Display Properties

In various embodiments, Related Searches recommendations may be displayed based on the following rules. The section label may be "Related Searches" or the section label may be "Hot Keywords." After each recommendation link (except the last recommendation link), a comma (not hyperlinked) may be shown. Additionally, characters may separate each recommendation, any words in a recommendation link that are being used in the current query may appear in bold, and any words in a recommendation link that are not being used in the current query may not appear in bold. For double byte sites the font size may be standard and for all other sites, the font size may be small.

Figure 8B:
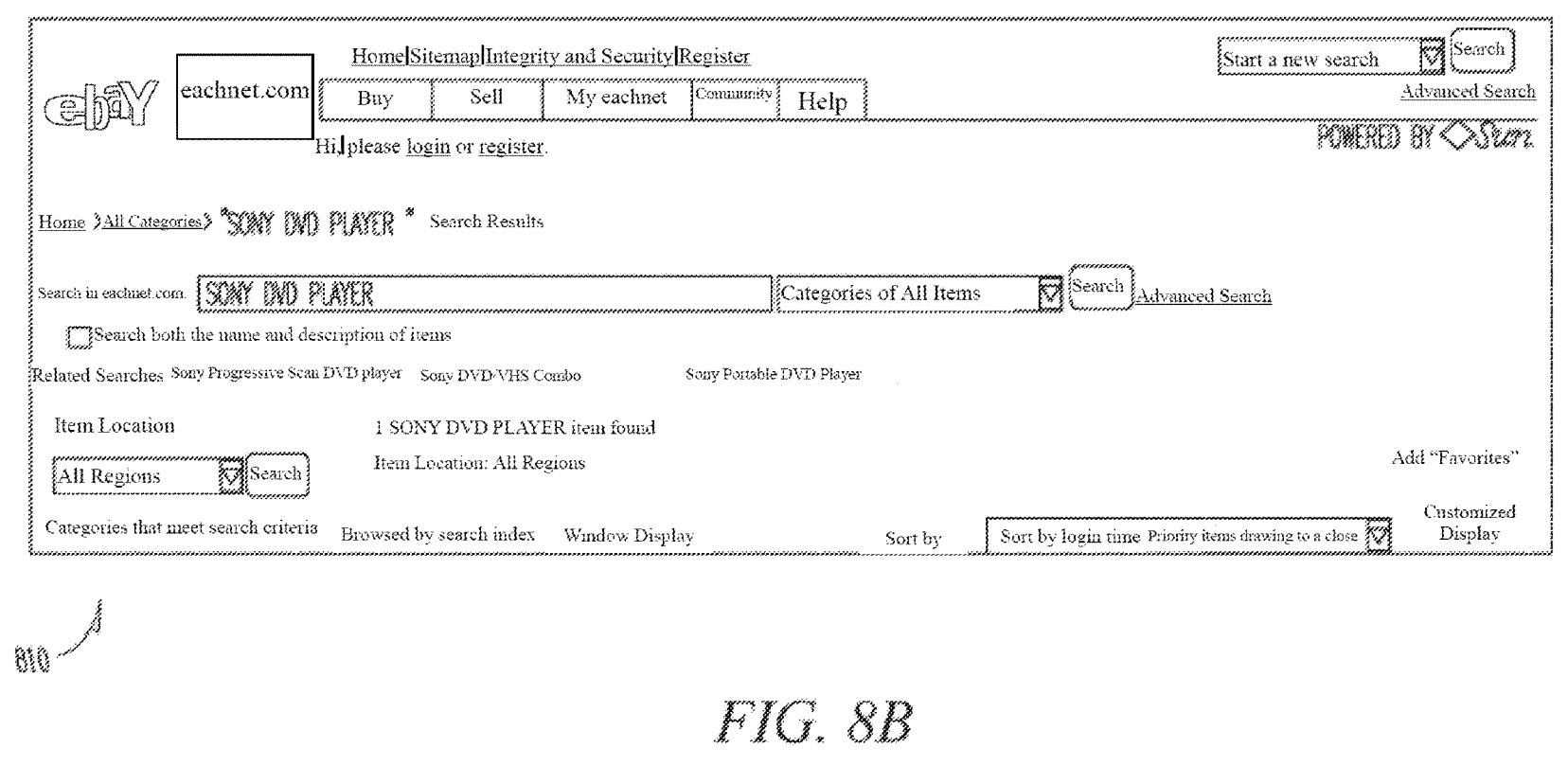

FIG. 8A illustrates an example page view 800 for use in an English language location other Western locations. Similarly FIG. 8B illustrates an example page view 810 for a non-English speaking location.

Navigation

Clicking on a Related Search recommendation may navigate the user to another Searching page where the previous search phrase is altered to the new search phrase but all other search parameters/filters/sorts have been maintained. For example, if no category constraint had been applied before the recommendation was clicked, then no category constraint would be applied after. If a category constrain had been applied before the recommendation was clicked, then the same category constraint would also be applied after. Any additional filters (search options, tab selections, etc.) would also be maintained after the recommendation was clicked. The search that the user had applied would continue to be applied after the recommendation was clicked. If the user was in cross-stores search, he would remain in cross-stores search. If he was in core search, he would remain in core search.

ssPageName Tracking ssPageNames may be added to the end of the anchors for each recommendation link. The formatting of the appended ssPageName may be &ssPageName=RELS:SA<X>:RS<Y>:<TYPE> where <X> may be an integer value (0–n). It may be the count of the number of search alternative-type recommendations that were displayed in the related searches widget <Y> may be an integer value (0–n). It may be the count of the number of refined search-type recommendations that were displayed in the related searches widget <TYPE> may be one of two values: RS or SA. RS may be the value if the recommendation type (for that link) is refined search and SA may be the value if the recommendation type (for that link) is search alternative Examples of ssPageNames:

Example 1: If two search alternative recommendations and three refined search recommendations are shown, the ssPageName for each search alternative recommendation may be &ssPageName=RELS:SA2:RS3:SA and the ssPageName for each refined search-type recommendation may be &ssPageName=RELS:SA2:RS3:RS.

Example 2: If zero search alternative recommendations and four refined search recommendations are shown, the ssPageName for each refined search-type recommendation may be &ssPageName=RELS:SA0:RS4:RS.

Recommendation Organization

If there are no recommendations available for a current search, such as used by a DLP (dynamic landing page), then the Related Searches module may not appear at all. A DLP is an intermediate search page which provides the user with multiple navigation options based upon their original search query, therefore for the purposes of this invention it can be classified as a search page. If there are recommendations available for the current DLP search, then the Related Searches module may appear. To determine how to display the recommendations, they may first be organized into search refinements and search alternatives based on the same logic as described above.

If there are search refinements but not search alternatives to display, the search refinements may take up the entire module. Search refinements may be shown in three columns, ordered first by row, then by column, as shown below:

| Link 1 | Link 2 | Link 3 |
| Link 4 | Link 5 | Link 6 |
| Link 7 | Link 8 |        |

A maximum of 15 search refinements can be shown when only search refinements appear.

If there are search alternatives but not search refinements to display, the search alternatives may take up the entire module. Search alternatives may be shown in three columns, ordered first by row, then by column, as shown below:

| Link 1 | Link 2 | Link 3 |
| Link 4 | Link 5 | Link 6 |
| Link 7 | Link 8 |        |

A maximum of 15 search alternatives can be shown when only search alternatives appear.

If both types of recommendations (search refinements and search alternatives) are available for the DLP, then the recommendations may be split into two sections by a graphical horizontal separator. For each section, related searches may be shown in three columns, ordered first by row, then by column, as shown below:

| Link 1 | Link 2 | Link 3 |
| Link 4 | Link 5 | Link 6 |
| Link 7 | Link 8 |        |

The ordering of the two subsections in the DLP may depend on the RECO_PREFERENCE_TYPE parameter setting described above. If RECO_PREFERENCE_TYPE is Search Refinements, then search refinements may appear above search alternatives. If RECO_PREFERENCE_TYPE is Search Alternatives, the search alternatives may appear above search refinements.

Regardless of whether the widget is split, a label for the applicable recommendation type may appear above the recommendations. The label for search refinements can be "Search Refinements:" and the label for search alternatives can be "Search Alternatives:".

In the base template, the total number of recommendation links appearing may be shown. (See site text "Top <N> related searches for <X>".) N always represents the total number of both types of recommendations. This supplemental text is not included in the specific item template.

A "Base Template" user interface 900 design with only search refinements appearing is illustrated in FIG. 9A. A "Base Template" user interface 910 design with both recommendation types appearing is illustrated in FIG. 9B. Similarly, a "Specific Item Template" interface design 1000 with only refines searches appearing is illustrated in FIG. 10. FIG. 11 illustrates a "Specific Item Template" interface 1100 design with both recommendation types appearing.

Displaying Related Searches on the Personalized Web Page

Search pages, listing pages, and DLPs may require new functionality to write information to a cookie. When viewed, each of these types of pages may update the cookie. The following logic may be used to determine whether the Search results pages, Listings pages, and DLPs may update this cookie. If the search contains an attribute value constraint, do not update the cookie. If the search is a title and description search, do not update the cookie. If the search contains any complex search operators (such as minus or parentheses), do not update the cookie. Once these checks have been made, count the characters (bytes in the case of double-byte language) in the search phrase and assign that value to X, count the number of characters of the category ID and assign that value Y and sum X and Y. If X+Y is greater than MAX_COOKIE_BYTE_COUNT, do not update the cookie. Else, update the cookie with the exact string of the query and the category ID.

This information may be sufficient to be able to make recommendations in the personalized web page. The MAX_COOKIE_BYTE_COUNT setting may be 40. This ensures that no more than 40 bytes are taken up in the cookie, while maximizing the likelihood of being able to surface high quality recommendations on the personalized web page. This proposed value may be vetted through the appropriate channels to gain agreement.

Add Related Searches to Personalized Web Page

A new module within the personalized web page may be created to display recommendations coming from the Related Searches system. The input for the Related Searches module may be the search phrase and the category constraint of the last search that the user ran. This "last search" may be from the current session or from a previous session. It may be available in the cookie. The output may be a list of recommendation links. The related searches widget may appear in the order of event recency, which is how the existing modules may already be ordered in production. The related searches widget may be titled "Related Searches".

Figure 12:

If the Last Search Did not Include a Category Constraint:

The related searches widget may contain a subtitle of "Your last search was <u><X></u>. Here are some related searches."<X> represents the search phrase of the last search. <X> may be hyperlinked and clicking it may navigate the user to the search results page for that search phrase. The requirements for displaying the recommendation links within the new Related Searches widget are exactly the same as for DLPs (described earlier). A Personalized web page 1200 for searching without category constraint is illustrated in FIG. 12.

If the Last Search Did Contain a Category Constraint:

The related searches widget may contain a subtitle of "Your last search was <u><X>(in<Y>)</u>. <X> represents the search phrase of the last search. If the category constraint was a meta level category, <Y> is the meta category name. If the category constraint was an L2 category, <Y> is the meta category name followed by ">" followed by the L2 category name. If the category constraint was L3 or below, <Y> is the meta category name followed by ellipses ( . . . ) followed by ">" followed by the name of the category that was applied as a constraint.

The entire string "<X> (in <Y>)" is hyperlinked and may navigate to run a search with that same search phrase and that same category constraint. When there is a category constraint, the subheadings for Search Refinements and Search Alternatives may also be modified. The subheading for the Search Refinements portion may be "Search Refinements (in the same category)". The subheading for the Search Alternatives portion may be "Search Alternatives (in the same category)".

The actual search refinement and search alternative links may all navigate to a search where those keywords are used, but constrained to the same category as the last search (which the recommendations are based on) was constrained to. FIG. 13 illustrates a Personalized web page 1300 for searching with category constraint.

Click-Through and Bid-Through Tracking

Click-through tracking may be accomplished through ssPageNames as defined above. Bid-through tracking and click-through rates may be determined. A variable may be added to indicate whether the Searching page contains related searches recommendations or not and whether the user clicked on a related searches recommendation to arrive at the current page. The values for this new variable may be for example 00, 01, 10, or 11, based on the following rules. The first digit may be 0 if the user did not click on Related Searches to arrive at the current page. The first digit may be 1 if the user clicked on Related Searches to arrive at the current page. The second digit may be 0 if Related Searches recommendations are not being shown on the current page. The second digit may be 1 if Related Searches recommendations are being shown on the current page.

Terminology

The term "listing" or "item" is used to provide an example of data, and may refer to any data item, description, identifier, representation or information pertaining to a listing, service, offering or request. For example, a listing may be an auction or fixed-price offering (e.g., products such as goods and/or services), an advertisement, or a request for a listing or service. For the purposes of this specification, the word "term" is synonymous with the word "phrase" and is also intended to include a plurality of words. Thus, "term" or "phrase" can be used to refer to any entry (or entries) a user enters into a search field when requesting a search of a data system. The term "term-category pair" (or phrase-category pair) may refer to a search term or phrase associated with a particular data category.

Transaction Facility

Figure 14:
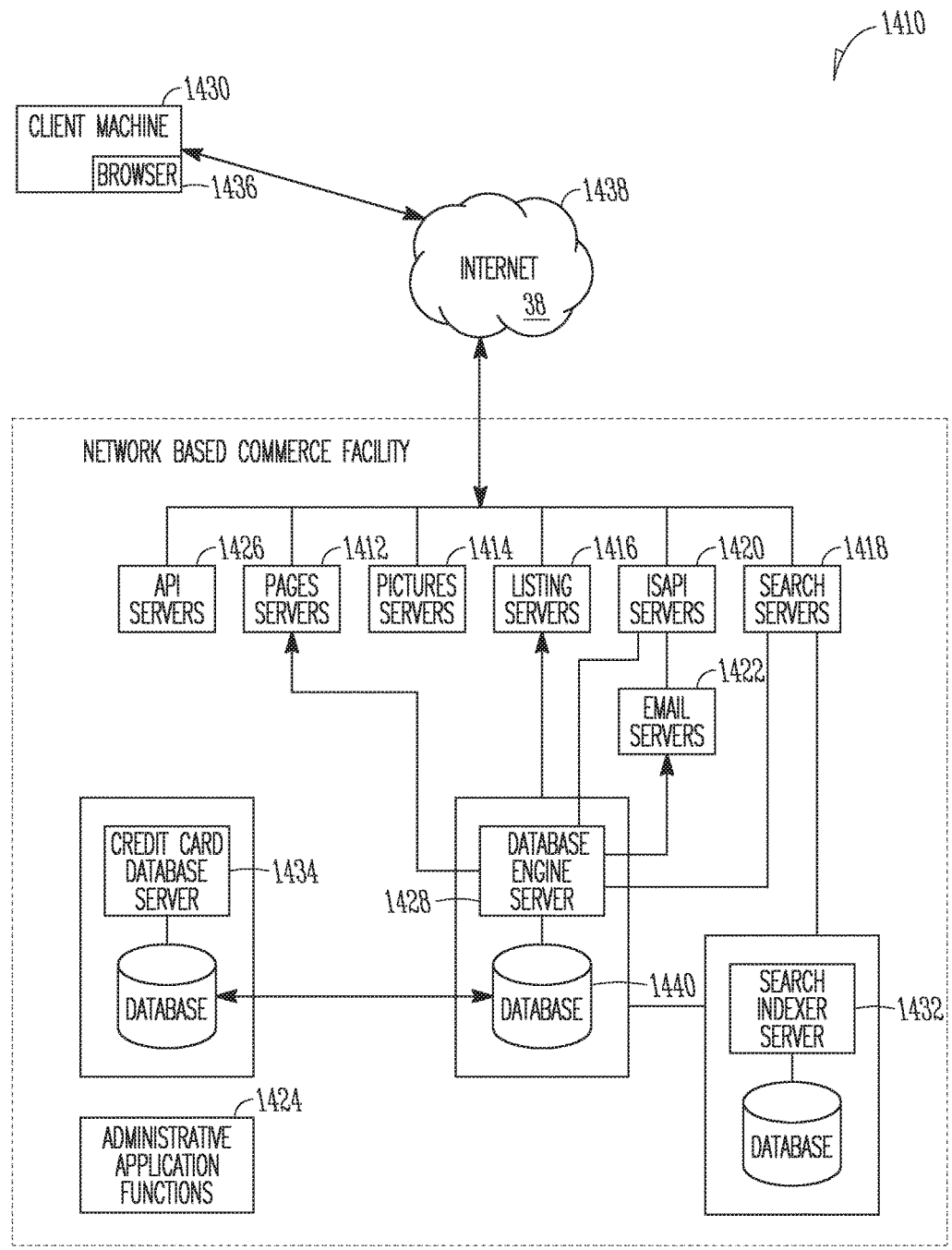
FIG. 14 is block diagram illustrating a network-based computer system.

FIG. 14 is block diagram illustrating a network-based computer system 1410, within which various embodiments may operate. While an exemplary embodiment of the present invention is described within the context of the network-based computer system 1410 for the purposes of illustration, the invention will find application in many different types of computer-based, and network-based, facilities and data processing systems.

The network-based computer system 1410, includes one or more of a number of types of front-end servers that each includes at least one Dynamic Link Library (DLL) to provide selected functionality. The system 1410 includes page servers 1412 that deliver web pages (e.g., mark-up language documents), picture servers 1414 that dynamically deliver images to be displayed within Web pages, listing servers 1416 that facilitate category-based browsing of listings, search servers 1418 that handle search requests to the system 1410 and facilitate keyword-based browsing of data, and ISAPI servers 1420 that provide an intelligent interface to a back-end of the system 1410. The system 1410 also includes e-mail servers 1422 that provide, inter alia, automated e-mail communications to users of the network-based computer system 1410. In one embodiment, one or more administrative application functions 1424 facilitate monitoring, maintaining, and managing the system 1410. One or more API servers 1426 may provide a set of API functions for querying and writing to the network-based computer system 1410. APIs may be called through the HTTP transport protocol. In one embodiment, information is sent and received using a standard XML data format. Applications utilized to interact (e.g., upload transaction listings, review transaction listings, manage transaction listings, etc.) with the network-based computer system 1410 may be designed to use the APIs. Such applications may be in an HTML form or be a CGI program written in C++, Perl, Pascal, or any other programming language. Exemplary APIs are more fully described in co-pending U.S. patent application Ser. No. 09/999,618, herein incorporated by reference.

The page servers 1412, API servers 1426, picture servers 1414, ISAPI servers 1420, search servers 1418, e-mail servers 1422 and a database engine server 1428 may individually, or in combination, act as a communication engine to facilitate communications between, for example, a client machine 1430 and the network-based computer system 1410. In addition, the page servers 1412, API servers 1426, picture servers 1414, ISAPI servers 1420, search servers 1418, e-mail servers 1422 and database engine server 1428 may individually, or in combination, act as a transaction engine to facilitate transactions between, for example, the client machine 1430 and the network-based computer system 1410. Furthermore, the page servers 1412, API servers 1426, picture servers 1414, ISAPI servers 1420, search servers 1418, e-mail servers 1422 and database engine server 1428 may individually, or in combination, act as a display engine to facilitate the display of listings on, for example, the client machine 1430.

The back-end servers may include the database engine server 1428, a search index server 1432 and a credit card database server 1434, each of which maintains and facilitates access to a respective database.

In one embodiment, the network-based computer system 1410 is accessed by a client program, such as for example a browser 1436 (e.g., the Internet Explorer distributed by Microsoft Corp. of Redmond, Wash.) that executes on the client machine 1430 and accesses the network-based computer system 1410 via a network such as, for example, the Internet 1438. Other examples of networks that a client may utilize to access the network-based computer system 1410 include a wide area network (WAN), a local area network (LAN), a wireless network (e.g., a cellular network), the Public Switched Telephone Network (PSTN) network, or the like. The client program that executes on the client machine 1430 may also communicate with the network-based computer system 1410 via the API servers 1426.

Database Structure

Figure 15:
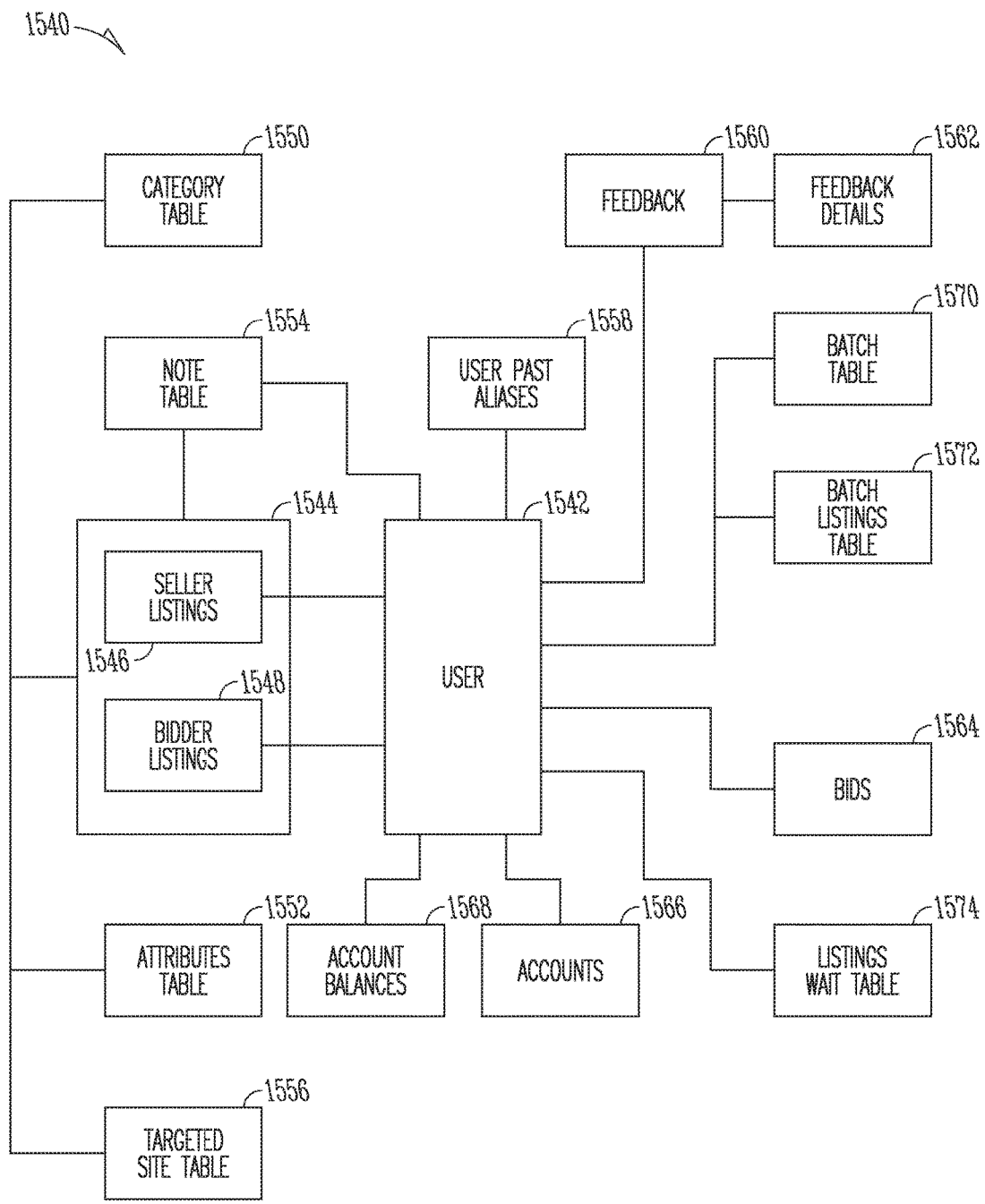
FIG. 15 is a database diagram illustrating an example database.

FIG. 15 is a database diagram illustrating an exemplary database 1540, maintained by and accessed via the database engine server 1428, which at least partially implements and supports the network-based computer system 1410.

In one embodiment, the database engine server 1428 may maintain two databases, a first database being maintained for listing (or offering) information that is not included within a virtual "store", and a second database for listing (or offering) information that is presented via a virtual "store" supported by the network-based computer system 1410.

The database 1540 may, in one embodiment, be implemented as a relational database, and includes a number of tables having entries, or records, that are linked by indices and keys. In an alternative embodiment, the database 1540 may be implemented as collection of objects in an object-oriented database.

The database 1540 includes a user table 1542 that contains a record for each user of the network-based computer system 1410. A user may operate as a seller, a buyer, or both, when utilizing the network-based computer system 1410. The database 40 also includes listings tables 44 that may be linked to the user table 42. The listings tables 44 may include a seller listings table 46 and a bidder listings table 48. A user record in the user table 42 may be linked to multiple listings that are being, or have been, listed or offered for sale via the network-based computer system 10. In one embodiment, a link indicates whether the user is a seller or a bidder (or buyer) with respect to listings for which records exist within the listings tables 44.

The database 1540 also includes one or more divisions in the form of categories provided in category tables 1550. Each record within the category table 1550 may describe a respective category. In one embodiment, listings provided by the system 10 are arranged in the categories. These categories may be navigable by a user of the network-based computer system 1410 to locate listings in specific categories. Thus, categories provide a mechanism to locate listings that may be browsed. In addition or instead, an alphanumeric search mechanism may be provided by the search servers 1420 to allow a user to search for specific listings using search terms or phrases. In one embodiment, the category table 1550 describes multiple, hierarchical category data structures, and includes multiple category records, each of which describes the context of a particular category within the multiple hierarchical category structures. For example, the category table 1550 may describe a number of real, or actual, categories to which listing records, within the listings tables 1544, may be linked.

The database 1540 also includes one or more attributes tables 1552. Each record within the attributes table 1552 describes a respective attribute associated with a listing. In one embodiment, the attributes table 1552 describes multiple, hierarchical attribute data structures, and includes multiple attribute records, each of which describes the context of a particular attribute within the multiple hierarchical attribute structures. For example, the attributes table 1552 may describe a number of real, or actual, attributes to which listing records, within the listings tables 1544, may be linked. Also, the attributes table 1552 may describe a number of real, or actual, attributes to which categories, within the category table 1550, may be linked.

The database 1540 may also include a note table 1554 populated with note records that may be linked to one or more listing records within the listings tables 1544 and/or to one or more user records within the user table 1542. Each note record within the note table 1554 may include, inter alia, a comment, description, history or other information pertaining to a listing being offered via the network-based computer system 1410, to a user of the network-based computer system 1410. The database 1540 may also include a targeted site table 1556 populated with targeted site records that may be linked to one or more listing records within the listings tables 1544 and/or to one or more user records within the user table 1542.

A number of other example tables may also be linked to the user table 1542, namely a user past aliases table 1558, a feedback table 1560, a feedback details table 1562, a bids table 1564, an accounts table 1566, and an account balances table 1568. In one embodiment, the database 1540 also includes a batch table 1570, a batch listings table 1572, and a listings wait table 1574.

In one embodiment, the system 1410 generates search recommendations to a user of the system 1410. The search recommendations may be based on past user interaction of the particular user with the system 1410, and search terms used in the network-based computer system 1410 (or any other systems associated with the network-based computer system 1410).

Figure 16:
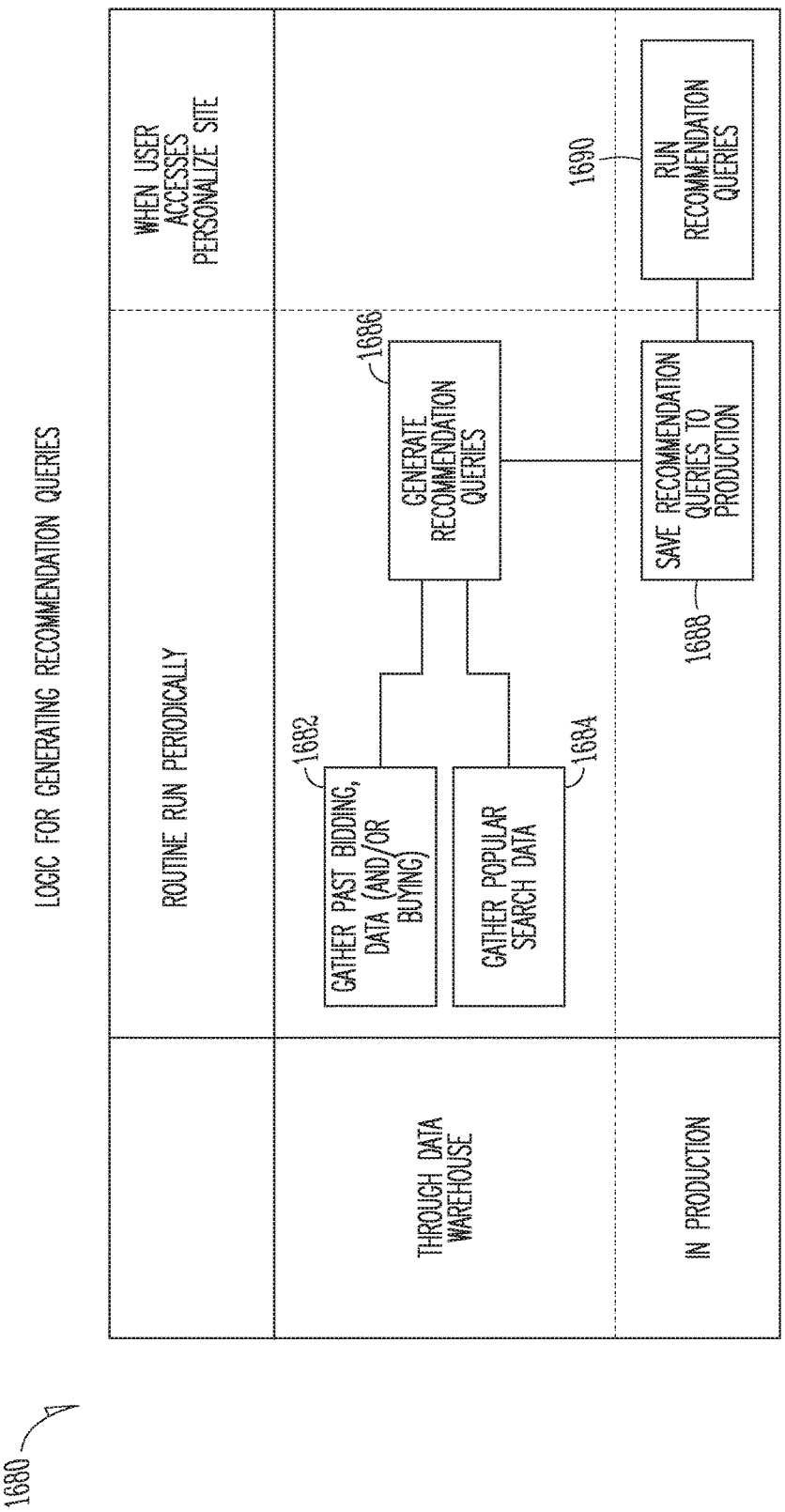
FIG. 16 illustrates example logic for generating recommendation queries based on past user interaction.
Figure 17:
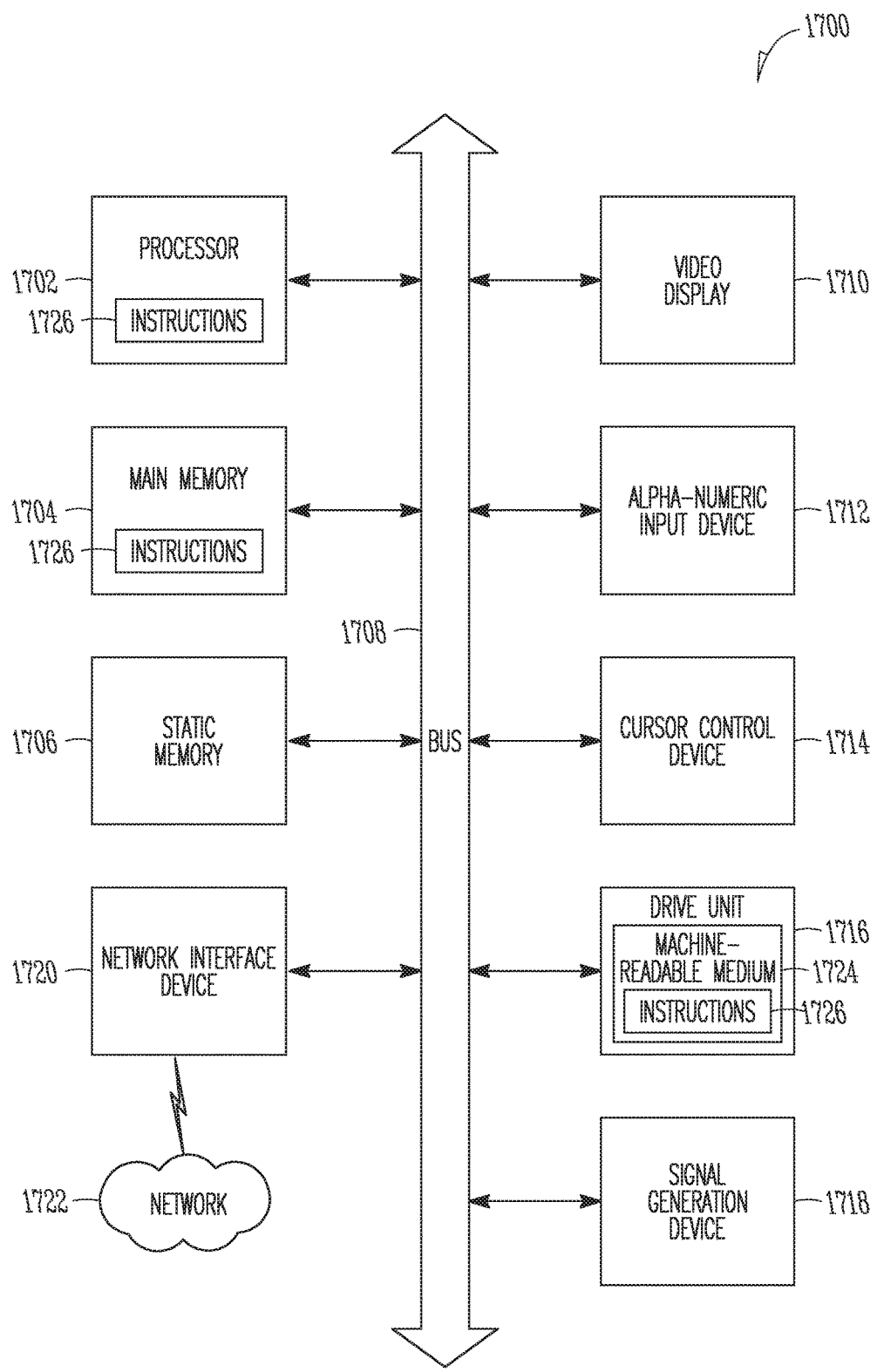
FIG. 17 shows a diagrammatic representation of a machine in the example form of a computer system.

Referring to FIG. 16, reference numeral 1680 generally indicates example logic for generating recommendation queries based on past user interaction in the form of past bidding (and/or buying) history of the user, and the search terms. As shown at block 1682 past bidding (and/or buying) data of participating users is gathered at a data warehouse. In addition, popular search terms or phrases are gathered at block 1684 that, together with the past bidding (and/or buying) data is used to generate recommendation queries (see block 1686). Thus, the data warehouse may identify and store search terms that are used most frequently (popular search terms) across one or more predetermined number of sites (e.g., web sites) associated with the network-based computer system 1410, and also identify data uniquely associated with each user. As shown at block 1688, the popular search terms may then be passed periodically (e.g., on a daily basis) to a production facility, where the production facility may then project the popular search data against current listing inventory (see block 1690). In one embodiment, a search is conducted through each category, at each category level, using each popular search term. All popular search terms that match at least a predetermined number of listings (e.g., 50 listings), located in each particular category, may be stored along with total number of listings located in the particular category using the popular search term. Thus, each category may have a number of popular search terms or phrases (e.g., from 0 to a predetermined number) assigned to it along with a measurement of the popularity of the search term in that category. Thus, the system 10 allows a search to be conducted through current listings based on popular searches (based on interaction of all users) and unique historical interaction of an FIG. 17 shows a diagrammatic representation of a machine in the example form of a computer system 1700 within which a set or sequence of instructions, for causing the machine to perform any one of the methodologies discussed herein, may be executed. In alternative embodiments, the machine may comprise a network router, a network switch, a network bridge, Personal Digital Assistant (PDA), a cellular telephone, a web appliance, set-top box (STB) or any machine capable of executing a sequence of instructions that specify actions to be taken by that machine.

The computer system 1700 includes a processor 1702, a main memory 1704 and a static memory 1706, which communicate with each other via a bus 1708. The computer system 1700 may further include a video display unit 1710 (e.g., a liquid crystal display (LCD) or a cathode ray tube (CRT)). The computer system 1700 also includes an alphanumeric input device 1712 (e.g., a keyboard), a cursor control device 1714 (e.g., a mouse), a disk drive unit 1716, a signal generation device 1718 (e.g., a speaker) and a network interface device 1720 to interface the computer system to a network 1722.

The disk drive unit 1716 includes a machine-readable medium 1724 on which is stored a set of instructions or software 1726 embodying any one, or all, of the methodologies described herein. The software 1726 is also shown to reside, completely or at least partially, within the main memory 1704 and/or within the processor 1702. The software 1726 may further be transmitted or received via the network interface device 1720. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to include, but not be limited to, solid-state memories, optical and magnetic disks, and carrier wave signals. Further, while the software is shown in FIG. 17 to reside within a single device, it will be appreciated that the software 1726 could be distributed across multiple machines or storage media, which may include the machine-readable medium.

Although the invention has been described with reference to various embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
    tracking activity with respect to a first query result of a first query and a second query result of a second query, the activity being performed by users of a network publication system;
    counting, from the tracked activity, a number of search events corresponding to users that viewed the second query result subsequent to the first query result and performed post search activity on the second query result;
    determining, using one or more processors, that the counted number of search events that corresponds to users that viewed the second query result subsequent to the first query result and performed post search activity on the second query result exceeds a predefined threshold;
    counting a further number of search events corresponding to users that viewed a third query result after the first query result and performed post search activity on the third query result, the third query result presented in response to a third query;
    determining that the further number of search events exceeds the counted number of search events;
    designating the third query as a recommended query for the first query;
    receiving the first query from a client device of a subsequent user;
    based on receiving the first query from the client device, providing a first set of results to the client device to be displayed in a first widget of a web interface; and
    based on the number of search events exceeding the predefined threshold and receiving the first query, recommending the second query within a second widget of the web interface;
    wherein the web interface is customizable by the subsequent user regarding visibility of the first widget and the second widget.

2. The method of claim 1, wherein:
    the tracking the activity includes determining that a category constraint for the first query is the same as a category constraint for the second query; and
    the counting the number of search events is based on the determining that the category constraint for the first query is the same as the category constraint for the second query.

3. The method of claim 2, further comprising causing display of an indication that the category constraint for the first query is the same as the category constraint for the second query via a search user interface on the client device.

4. The method of claim 1, wherein:
    the tracking the activity includes determining that a search phrase for the first query is not the same as a search phrase for the second query, and
    the counting the number of search events is based on the determining that the search phrase for the first query is not the same as the search phrase for the second query.

5. The method of claim 1, wherein the recommending the second query includes causing display of the second query in a search user interface on the client device.

6. The method of claim 5, wherein the causing the display of the second query in the search user interface includes causing display of a link in the search user interface, the link being selectable to perform a search using the second query.

7. The method of claim 1, wherein:
    the second query result indicates a product page published by the network publication system, the product page featuring a product; and
    the post search activity on the second query result includes purchasing the product featured in the product page.

8. The method of claim 1, further comprising:
    determining that the second query includes all keywords in the first query, and
    causing display of an indication that the second query is a refined query for the first query based on the determining that the second query includes all the keywords in the first query.

9. The method of claim 1, further comprising:
    determining that the second query does not include all keywords in the first query, and
    causing display of an indication that the second query is an alternative query for the first query based on the determining that the second query does not include all keywords in the first query.

10. A system comprising:
    one or more processors; and
    one or more non-transitory computer readable media containing instructions that, when executed by the one or more processors, cause the system to perform operations comprising:
    track activity with respect to a first query result of a first query and a second query result of a second query, the activity being performed by users of the system,
    count, from the tracked activity, a number of search events corresponding to users that viewed the second query result subsequent to the first query result and performed post search activity on the second query result;
    determine that the counted number of search events that corresponds to users that viewed the second query result subsequent to the first query result and performed post search activity on the second query result exceeds a predefined threshold;
    count a further number of search events corresponding to users that viewed a third query result after the first query result and performed post search activity on the third query result, the third query result resented in response to a third query;
    determine that the further number of search events exceeds the counted number of search events;
    designate the third query as a recommended query for the first query;
    receive the first query from a client device of a subsequent user;
    based on receiving the first query from the client device, provide a first set of results to the client device to be displayed in a first widget of a web interface; and
    based on the number of search events exceeding the predefined threshold and receiving the first query, recommend the second query within a second widget of the web interface;
    wherein the web interface is customizable by the subsequent user regarding visibility of the first widget and the second widget.

11. The system of claim 10, wherein the operations further comprise:
   determine that a category constraint for the first query is the same as a category constraint for the second query; and
   count the number of search events based on the determining that the category constraint for the first query is the same as the category constraint for the second query.

12. The system of claim 11, wherein the operations further comprise:
   cause display of an indication that the category constraint for the first query is the same as the category constraint for the second query via a search user interface on the client device.

13. The system of claim 10, wherein the operations further comprise:
   determine that a search phrase for the first query is not the same as a search phrase for the second query; and
   count the number of search events based on the determining that the search phrase for the first query is not the same as the search phrase for the second query.

14. The system of claim 10, wherein the operations further comprise cause display of a link in the search user interface, the link being selectable to perform a search using the second query.

15. The system of claim 10, wherein:
   the second query result indicates a product page published by the system, the product page featuring a product; and
   the post search activity on the second query result includes purchasing the product featured in the product page.

16. A non-transitory machine-readable medium storing instructions that, when executed by one or more processors of a machine, cause the machine to perform operations comprising:
   tracking activity with respect to a first query result of a first query and a second query result of a second query, the activity being performed by users of a network publication system;
   counting, from the tracked activity, a number of search events corresponding to users that viewed the second query result subsequent to the first query result and performed post search activity on the second query result;
   determining that the counted number of search events that corresponds to users that viewed the second query result subsequent to the first query result and performed post search activity on the second query result exceeds a predefined threshold;
   counting a further number of search events corresponding to users that viewed a third query result after the first query result and performed post search activity on the third query result, the third query result resented in response to a third query;
   determining that the further number of search events exceeds the counted number of search events;
   designating the third query as a recommended query for the first query;
   receiving the first query from a client device of a subsequent user;
   based on receiving the first query from the client device, providing a first set of results to the client device to be displayed in a first widget of a web interface; and
   based on the number of search events exceeding the predefined threshold and receiving the first query, recommending the second query within a second widget of the web interface;
   wherein the web interface is customizable by the subsequent user regarding visibility of the first widget and the second widget.

17. The system of claim 10, wherein the operations further comprise:
   determining that the second query includes all keywords in the first query, and
   causing display of an indication that the second query is a refined query for the first query based on the determining that the second query includes all the keywords in the first query.

18. The system of claim 10, wherein the operations further comprise:
   determining that the second query does not include all keywords in the first query, and
   causing display of an indication that the second query is an alternative query for the first query based on the determining that the second query does not include all keywords in the first query.

* * * * *